US011250498B2

(12) United States Patent
Clements et al.

(10) Patent No.: US 11,250,498 B2
(45) Date of Patent: Feb. 15, 2022

(54) SALES MECHANISM AND DIGITAL INTERFACE THEREFOR

(71) Applicant: OPENN TECH PTY LTD, Claremont (AU)

(72) Inventors: Peter Edward Clements, Claremont (AU); Peter John Gibbons, Swanbourne (AU); Bradley Robert Glover, Fremantle (AU)

(73) Assignee: OPENN TECH PTY LTD, Claremont (AU)

( * ) Notice: Subject to any disclaimer, the term of this patent is extended or adjusted under 35 U.S.C. 154(b) by 201 days.

(21) Appl. No.: 16/311,989

(22) PCT Filed: Jun. 23, 2017

(86) PCT No.: PCT/AU2017/050642
§ 371 (c)(1),
(2) Date: Dec. 20, 2018

(87) PCT Pub. No.: WO2017/219092
PCT Pub. Date: Dec. 28, 2017

(65) Prior Publication Data
US 2019/0213668 A1    Jul. 11, 2019

(30) Foreign Application Priority Data
Jun. 23, 2016   (AU) ................................. 2016902474

(51) Int. Cl.
*G06Q 30/00*   (2012.01)
*G06Q 30/08*   (2012.01)
(Continued)

(52) U.S. Cl.
CPC .............. *G06Q 30/08* (2013.01); *G06Q 30/06* (2013.01); *G06Q 30/0641* (2013.01); *G06Q 50/167* (2013.01)

(58) Field of Classification Search
None
See application file for complete search history.

(56) References Cited

U.S. PATENT DOCUMENTS

2001/0021923 A1*   9/2001   Atkinson ........... G06Q 30/0601
                                                              705/37
2002/0007338 A1*   1/2002   Do ......................... G06Q 40/04
                                                              705/37
(Continued)

FOREIGN PATENT DOCUMENTS

JP          2009193236 A   *   8/2009   ............. G06Q 30/06

OTHER PUBLICATIONS

Zheng Qin, "Introduction to E-commerce", 2009, Springer, springer.com (Year: 2009).*
(Continued)

*Primary Examiner* — Naeem U Haq
*Assistant Examiner* — Norman Donald Sutch, Jr.
(74) *Attorney, Agent, or Firm* — MH2 Technology Law Group, LLP

(57) ABSTRACT

The invention relates to a system 10 for conducting a sales mechanism over the internet in accordance with an embodiment of the invention. The system 10 comprises a sales platform 18 for vendors of items such as a real estate property, sales facilitators 16 to administer the sales mechanism, and buyers (also referred to as bidders 14) to interact for selling and buying the items offered for sale. The description to follow will refer to a particular application of the sales mechanism for offering for sale a real estate property; however, the sales mechanism may be utilised for offering for sale any tangible or intangible items that is able to be sold.

22 Claims, 19 Drawing Sheets

(51) Int. Cl.
*G06Q 30/06* (2012.01)
*G06Q 50/16* (2012.01)

(56) References Cited

U.S. PATENT DOCUMENTS

| | | | |
|---|---|---|---|
| 2003/0041012 A1* | 2/2003 | Grey | G06Q 40/02 |
| | | | 705/37 |
| 2004/0039733 A1* | 2/2004 | Soulanille | G06F 16/951 |
| 2005/0108125 A1 | 5/2005 | Goodwin et al. | |
| 2008/0147566 A1* | 6/2008 | Malik | G06Q 30/08 |
| | | | 705/36 R |
| 2012/0084168 A1* | 4/2012 | Adair | G06Q 30/08 |
| | | | 705/26.3 |
| 2012/0136745 A1* | 5/2012 | Chalemin | G06Q 40/04 |
| | | | 705/26.3 |
| 2012/0284141 A1* | 11/2012 | Ausubel | G06Q 30/08 |
| | | | 705/26.3 |
| 2013/0046650 A1* | 2/2013 | Geurts | G06Q 30/08 |
| | | | 705/26.3 |
| 2013/0054317 A1* | 2/2013 | Abhyanker | G06Q 30/08 |
| | | | 705/14.4 |
| 2013/0091047 A1* | 4/2013 | Hough | G06Q 40/04 |
| | | | 705/37 |
| 2013/0103530 A1 | 4/2013 | Tilford et al. | |
| 2013/0232024 A1* | 9/2013 | Nassiri | G06Q 30/08 |
| | | | 705/26.3 |
| 2014/0330664 A1* | 11/2014 | Lisitza | G06Q 30/08 |
| | | | 705/26.3 |
| 2016/0042447 A1* | 2/2016 | Nassiri | G06Q 30/0641 |
| | | | 705/26.3 |
| 2017/0076363 A1* | 3/2017 | Le | G06Q 50/167 |

OTHER PUBLICATIONS

Erica Johnston; "Online auction can keep car prices at bay", Aug. 16, 2005; Postmedia Network Inc.; Edmonton Journal (Year: 2005).*
International Search Report and Written Opinion dated Sep. 8, 2017 from International Application No. PCT/AU2017/050642 (Authorised officer, Ravi McCosker), 10 pages.

* cited by examiner

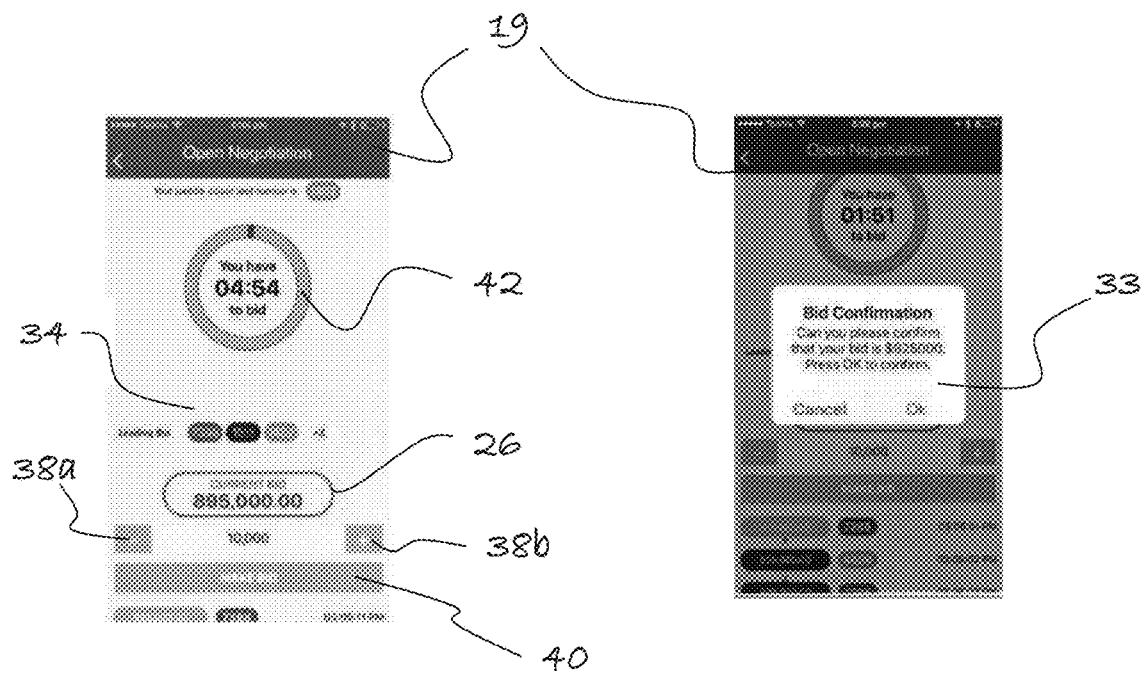
Fig 8                        Fig 9
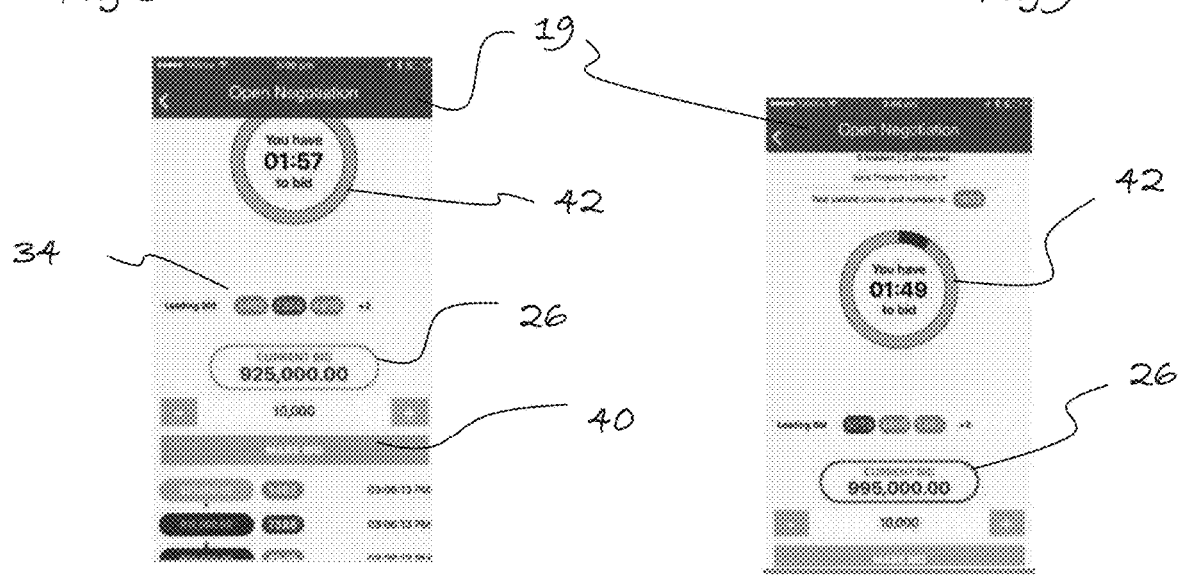
Fig 10                     Fig 11

SALES MECHANISM AND DIGITAL INTERFACE THEREFOR

CROSS-REFERENCE TO RELATED APPLICATIONS

This application is a U.S. National Stage application of PCT/AU2017/050642 filed 23 Jun. 2017, which claims priority to Australian Application No. 2016902474 filed 23 Jun. 2016, the entire disclosures of which are hereby incorporated by reference in their entireties.

TECHNICAL FIELD

The present invention relates to mechanisms for selling goods and services

The invention has been devised particularly, although not necessarily solely, in relation to mechanism for selling real-estate properties.

BACKGROUND ART

The following discussion of the background art is intended to facilitate an understanding of the present invention only. The discussion is not an acknowledgement or admission that any of the material referred to is or was part of the common general knowledge as at the priority date of the application.

There exist a great variety of mechanisms for selling goods and services. Examples of these conventional sales mechanisms are auction, tender and private treaty.

The currently known sales mechanisms of goods and services such as the one mentioned above include several drawbacks. Some of these sales mechanisms make it nearly impossible for a certain group of potential purchasers of the goods and services to participate in these conventional sales mechanisms.

Examples of potential purchasers that typically cannot participate in these sales mechanisms are purchasers who are not cash unconditional buyers but instead their purchasing capacity is subject to terms and conditions such as finance, extended settlement dates, and alternate deposit amounts.

Auction processes are particular sales mechanisms that very often are used for selling of real-estate property.

Several auction processes have been in use for years. Prior to the internet era only traditional auctions were available which conventionally took the form of a public gathering of participants assembled together within a specified location; this location being typically where the items to be auctioned were present and available to view by the participants of the auction. At such conventional auctions, an auctioneer is the conductor of the auction and the individual responsible for providing the goods to the participants of the auction. Incited by the direction of the auctioneer, bidding was conducted simultaneously, successively and competitively among a group of participants present at the auction site. These auctions had their limitations. In particular, if a relative large number of bidders is present at the auction of a real-estate property not necessarily any of the entire group of bidders have the opportunity to submit a bid. For example, only bidders located closest to the auctioneer are able to provide an overriding bid; bidders located the farthest to the auctioneer may not be capable to submit an overriding bid.

Furthermore, another disadvantage of an auction is that once a successful bidder has secured a particular real-estate property, the remaining bidders leave the auction, making it difficult for auctioneers to follow them up should the sale of the real-estate property not be concluded.

Moreover, a further disadvantage is that there is often a reticence from potential bidders to publically bid; this is because, by publically bidding these bidders identify themselves as potential buyers and publicly disclose their financial capacity to purchase goods and services.

With the advent of the internet; there have been intentions to organise auctions that permit the participants (in particular the bidders) to be located remotely with respect to the location of the auction item (such as a real-estate property). An example of an auction process that permits bidders to be located remotely from the location of the auction item is based on providing a table on a sheet of paper that could be electronically passed around the bidders for each bidder to fill out with an overriding bid.

The previously described "on-line" auction process has its disadvantages. For example, it is difficult to ensure that each bidder submits the bid in substantially the same time period. Typically, some persons would not necessarily be diligent when entering the overriding bid and passing on the filled table to the next bidder as soon as possible.

Furthermore, the above described bidding process was not transparent because the table was not filled out with the overriding bid in front of all of the participant; instead it was filled out by each participant at the privacy of their home or office and then passed onto to the next bidder; thus, all of the bidders did not immediately know the amount of the overriding bid. Also, the above mentioned factors introduced a substantial delay in the bidding process. Thus, the auction typically spread over considerable periods of time.

Moreover, the order in which the table was passed between bidders may produce unfair advantages to a group of bidders when compared to another group of bidders listed, for example, at the end of the list. Thus, this particular auction process does not allow all bidders to bid simultaneously.

It is against this background that the present invention has been developed.

SUMMARY OF INVENTION

According to a first aspect of invention there is provided a method for conducting a sales process of an item of real estate to a plurality of bidders, the method comprises the steps of:

storing information representative of the item in a data storage means by a sales facilitator;

storing by the sales facilitator particular values of parameters for controlling the sales process in the data storage means, the parameters comprising (1) first to fifth time periods, (2) a cost for buying the item now, (3) a reserve price of the item;

starting a countdown timer for measuring a particular period of time; storing information representative of each of the bidders in the data storage means;

displaying a first activable graphics in each of a plurality of bidder graphical interfaces, the first activable graphics being adapted for each of the bidders to input a starting bid for purchasing the item;

displaying in each of the bidder graphical interfaces a second activable graphics displaying the cost for buying the item now;

displaying in each of the bidder graphical interfaces a third activable graphics adapted to add when activated to the starting bid a bid increment to increase the value of the starting bid to generate an improved bid;

while the particular period of time is less than the first
period of time, iteratively performing the steps a and b:
  a) while the particular period of time is less than
    the difference between the first period of time and the
    second period of time permitting the bidders to
    activate the third activable graphics to continuously
    improve the value of their improved bid unless one
    particular bidder activated the second activable
    graphics displaying the cost for buying the item now
    in order to purchase the item and culminate the sales
    process;
  b) when the particular period of time is greater than the
    difference between the first period of time and the
    second period of time impeding the bidders from
    activating the second and third activable graphics;
resetting the count-down timer to zero and restarting the
  count-down time for measuring another particular
  period of time;
displaying in each of the bidder graphical interfaces a
  fourth activable graphics adapted to improve, when
  activated by a particular bidder, the bid of the particular
  bidder;
while the another particular period of time is less than the
  fourth period of time and any improved bid is smaller
  than the reserve price, iteratively performing the steps
  c and d:
  c) permitting any bidder to improve its earlier bid by
    activating the fourth activable graphics; and
  d) comparing any of the bid result of improving it
    earlier after activation of the fourth activable graphics with the reserve price;
resetting the count-down timer to zero when any
  improved bid is greater or equal to the reserve price and
  restarting the count-down time for measuring a further
  particular period of time;
while the further particular period of time is less than the
  fifth period of time, iteratively performing the step:
  e) permitting any bidder to improve its earlier bid by
    activating the fourth activable graphics;
selling the item to the bidder having the highest improved
  when compared to the improved bids of the other
  bidders.

Preferably, the information representative of each bidder comprises the terms of engagement proposed by each bidder.

Preferably, the terms of engagement by each bidder may differ from the terms of engagement proposed by each of the other bidders.

Preferably, the second activable graphics displaying the cost for buying the item now may be selectively removed or reinstated from the sales process.

Preferably, one or more algorithms control removal or reinstating of the second activable graphics.

Preferably, sales process may be selectively paused and restarted by the sales facilitator.

Preferably, the method further comprises the step of issuing a notification that a particular bid is equal or greater than reserve price of the item offered for sale.

Preferably, the bids may be improved by increment bids, the bidders and the sales facilitator being able to vary the value of the increment bids.

Preferably, the bids may be improved by increment bids, the bidders being able to vary the value of the increment bids via the fourth activable graphics and the sales facilitator being able to vary the value of the increment bids via activable graphics displayed in the sales facilitator graphical interface.

Preferably, the method further comprises the step of displaying a particular icon showing the highest current bid made by a particular bidder with respect the bids of the other bidders.

Preferably, the method further comprises a unique bidder identification for each bidder comprising an icon including an image showing the code of each bidder, wherein the bidder identification for each bidder is assigned a particular characteristic that differs from the characteristic of any other bidder.

Preferably, the icon is assigned the same characteristic of the bidder that the made the highest current bid displayed in particular icon.

Preferably, the characteristic comprises colour.

Preferably, the method further comprises the step of decreasing the value of the cost for buying the item now during a first stage of the sales process.

Preferably, the method further comprises the step of displaying a sixth activable graphics displaying the current highest bid.

Preferably, the second activable graphics displaying the cost for buying the item now and the sixth activable graphics displaying the current highest bid are displayed adjacent each other.

Preferably, the method further comprises the step of permitting any of the bidder withdraw from the sales process Preferably, the method further comprises the step of permitting the sales facilitator to remove a bid made by a particular bidder.

Preferably, the method further comprises the step of displaying the last bid made by each bidder.

Preferably, the step of impeding the bidders from activating the second and third activable graphics comprises the step of removing the second and third activable graphics from the bidder graphical interface.

Preferably, the step of removing the second and third activable graphics from the bidder graphical interface is conducted by the sales facilitator through the sales facilitator graphical interface.

According to a second aspect of invention there is provided a computer system for conducting a sales process, the computer system comprising:
  a server computer comprising at least one processor
    executing executable code and at least one memory
    device communicating with the processor accessible
    via a computer network and storing the executable
    code, wherein the executable code, when executed by
    the at least one processor, causes the at least one
    processor to:
  generate and transmit a signal to a plurality of bidder
    computing devices and a sales facilitator computing
    device, the signal being representative of a web site for
    offering for sale and selling an item of real estate, the
    web site comprising a plurality of instances of graphical interfaces comprising activable graphics capable to
    be activated by the sales facilitator and comprising a
    plurality of instances of graphical interfaces comprising activable graphics capable to be activated by the
    bidders;
  receiving first and second signals from the sales facilitator
    computing device through activation of the sales facilitator's activable graphics, the first signal being indicative of information representative of the item and
    storing the information in the memory device, and the
    second signal being representative of particular values
    of parameters for controlling the sales process in the
    memory devices, the parameters comprising at least:

(1) first to fifth time periods, (2) a cost for buying the item now, (3) a reserve price of the item and storing the values of parameters in the memory device;

starting a countdown timer for measuring a particular period of time and generate and transmit a signal to the plurality of bidder computing devices, the signal being representative of the remaining time provided by the countdown timer and of a particular instance of a graphical interface adapted to display the remaining time for visualisation by the bidders; receiving signals from each of the bidder computing devices through activation of particular activable graphics of the bidder's graphical interface, each signal being indicative of information representative of each bidder and storing the values of information representative of each bidder in the memory device;

receiving signals from each of the bidder computing devices through activation of a first activable graphics of a particular instance of the bidder graphical interfaces, each signal being indicative of information representative of the value of a starting bid of each bidder for purchasing the item and storing the value of the starting bid of each bidder in the memory device;

generate and transmit a signal to the plurality of bidder computing devices, the signal being representative of the cost for buying the item now and of a second activable graphic of a particular instance of the bidder graphical interface for displaying of the cost for buying the item now;

generate and transmit a signal to the plurality of bidder computing devices, the signal being representative of a third activable graphics of a particular instance of the bidder's graphical interface adapted to add when activated by the bidders to the starting bid a bid increment to increase the value of the starting bid to generate an improved bid;

while the particular period of time is less than the first period of time, iteratively performing the steps a and b:
  a) while the particular period of time of time is less than the difference between the first period of time and the second period of time permitting the bidders to activate the third activable graphics to continuously improve the value of their improved bid unless one particular bidder activated the second activable graphics displaying the cost for buying the item now in order to purchase the item and culminate the sales process;
  b) when the particular period of time is greater than the difference between the first period of time and the second period of time impeding the bidders from activating the second and third activable graphics;

resetting the count-down timer to zero and restarting the count-down timer for measuring another particular period of time; generate and transmit a signal to the plurality of bidder computing devices, the signal being representative of the another remaining time provided by the countdown timer and of a particular instance of the bidder's graphical interface for displaying the another remaining time for visualisation by the bidders;

generate and transmit a signal to the plurality of bidder computing devices, the signal being representative of a fourth activable graphics of a particular instance of the bidder's graphical interface adapted to improve, when activated by a particular bidder, the bid of the particular bidder; while the another particular period of time is less than the fourth period of time and any improved bid is smaller than the reserve price, iteratively performing the steps c and d:
  c) permitting any bidder to improve its earlier bid by activating the fourth activable graphics; and
  d) comparing any of the bid result of improving it earlier after activation of the fourth activable graphics with the reserve price;

resetting the count-down timer to zero when any improved bid is greater or equal to the reserve price and restarting the count-down time for measuring a further particular period of time and generate and transmit a signal to the plurality of bidder computing devices, the signal being representative of the further remaining time provided by the countdown timer and of a particular instance of the bidder graphical interface for displaying the further remaining time for visualisation by the bidders; and while the further particular period of time is less than the fifth period of time, iteratively performing the step:
  e) permitting any bidder to improve its earlier bid by activating the fourth activable graphics;

selling the item to the bidder having the highest improved bid when compared to the improved bids of the other bidders.

According to a third aspect of invention there is provided a computer readable storage medium storing one or more programs, the one or more programs comprising instructions that, when rendered on a remote computing device, cause the remote computing device to display a web site comprising a plurality of graphical interfaces capable to be activated by a sales facilitator or a plurality of graphical interfaces capable to be activated by a particular bidder when the remote computing device is connected over the internet to a server computer comprising at least one processor executing executable code and at least one memory device communicating with the processor accessible via a computer network and storing the executable code, wherein the executable code, when executed by the at least one processor, causes the at least one processor to:

generate and transmit a signal to a plurality of bidder computing devices and a sales facilitator computing device, the signal being representative of a web site for offering for sale and selling an item of real estate, the web site comprising a plurality of instances of graphical interfaces comprising activable graphics capable to be activated by the sales facilitator and comprising a plurality of instances of graphical interfaces comprising activable graphics capable to be activated by the bidders;

receiving first and second signals from the sales facilitator computing device through activation of the sales facilitator's activable graphics, the first signal being indicative of information representative of the item and storing the information in the memory device, and the second signal being representative of particular values of parameters for controlling the sales process in the memory devices, the parameters comprising at least: (1) first to fifth time periods, (2) a cost for buying the item now, (3) a reserve price of the item and storing the values of parameters in the memory device;

starting a countdown timer for measuring a particular period of time and generate and transmit a signal to the plurality of bidder computing devices, the signal being representative of the remaining time provided by the countdown timer and of a particular instance of a graphical interface adapted to display the remaining time for visualisation by the bidders; receiving signals from each of the bidder computing devices through activation of particular activable graphics of the bidder's graphical interface, each signal being indicative of information representative of each bidder and storing the values of information representative of each bidder in the memory device;

receiving signals from each of the bidders computing device through activation of a first activable graphics of a particular instance of the bidder graphical interfaces, each signal being indicative of information representative of the value of a starting bid of each bidder for purchasing the item and storing the value of the starting bid of each bidder in the memory device;

generate and transmit a signal to the plurality of bidder computing devices, the signal being representative of the cost for buying the item now and of a second activable graphic of a particular instance of the bidder graphical interface for displaying of the cost for buying the item now;

generate and transmit a signal to the plurality of bidder computing devices, the signal being representative of a third activable graphics of a particular instance of the bidder's graphical interface adapted to add when activated by the bidders to the starting bid a bid increment to increase the value of the starting bid to generate an improved bid;

while the particular period of time is less than the first period of time, iteratively performing the steps a and b:
  a. while the particular period of time of time is less than the difference between the first period of time and the second period of time permitting the bidders to activate the third activable graphics to continuously improve the value of their improved bid unless one particular bidder activated the second activable graphics displaying the cost for buying the item now in order to purchase the item and culminate the sales process;
  b. when the particular period of time is greater than the difference between the first period of time and the second period of time impeding the bidders from activating the second and third activable graphics;

resetting the count-down timer to zero and restarting the count-down timer for measuring another particular period of time; generate and transmit a signal to the plurality of bidder computing devices, the signal being representative of the another remaining time provided by the countdown timer and of a particular instance of the bidder's graphical interface for displaying the another remaining time for visualisation by the bidders;

generate and transmit a signal to the plurality of bidder computing devices, the signal being representative of a fourth activable graphics of a particular instance of the bidder's graphical interface adapted to improve, when activated by a particular bidder, the bid of the particular bidder; while the another particular period of time is less than the fourth period of time and any improved bid is smaller than the reserve price, iteratively performing the steps c and d:
  c) permitting any bidder to improve its earlier bid by activating the fourth activable graphics; and
  d) comparing any of the bid result of improving it earlier after activation of the fourth activable graphics with the reserve price;

resetting the count-down timer to zero when any improved bid is greater or equal to the reserve price and restarting the count-down time for measuring a further particular period of time and generate and transmit a signal to the plurality of bidder computing devices, the signal being representative of the further remaining time provided by the countdown timer and of a particular instance of the bidder graphical interface for displaying the further remaining time for visualisation by the bidders; and while the further particular period of time is less than the fifth period of time, iteratively performing the step:
  e) permitting any bidder to improve its earlier bid by activating the fourth activable graphics;

selling the item to the bidder having the highest improved bid when compared to the improved bids of the other bidders.

According to a fourth aspect of invention there is provided a graphical interface displayed by a sales facilitator's computing device connected to the computer system in accordance with the second aspect of the invention, the graphical interface comprising a plurality of instances displaying a plurality of activable graphics and icons showing information and, wherein the information comprises at least: values of time periods, bids, buy-now price and bid increments and current bids of each bidder, and the activable graphics being adapted to be activated by the sales facilitator for managing the sales process.

Preferably, the plurality of activable graphics comprises an activable graphic for selectively removing or reinstating the second activable graphics displaying the cost for buying the item now.

Preferably, the plurality of activable graphics comprise another activable graphics for removing a particular bid made by a bidder.

According to a fifth aspect of invention there is provided a graphical interface displayed by a bidder's computing device connected to the computer system in accordance with the second aspect of the invention, the graphical interface comprising a plurality of instances displaying trough icons information and a plurality of activable graphics, wherein the information comprises at least: values of time periods, bids, buy-now price and bid increments and current bids of each bidder, and the activable graphics being adapted, upon activation by a bidder, to provide to the server computer at least: bidder's information, the starting bid, the bid increments and the improved value of the bid, the intention to buy the item at the buy-now price, and the intention to withdraw from the sales process.

Preferably, the plurality of activable graphics comprise first activable graphics being adapted for each of the bidders to provide a starting bid for purchasing the item.

Preferably, the plurality of activable graphics comprise a third activable graphics adapted to improve, when activated by a particular bidder, the bid of the particular bidder.

Preferably, the plurality of activable graphics comprise a fourth activable graphics adapted to improve, when activated by a particular bidder, the bid of the particular bidder.

Preferably, the graphical interface comprises (1) at least one first icon showing remaining time as provided by the countdown timer and a second icon showing the highest current bid made by a particular bidder with respect the bids of the other bidders, and (2) a second activable graphics displaying the cost for buying the item now and a third activable graphics adapted to add to the starting bids, when activated by the bidders, a bid increment to increase the value of the starting bids to generate improved bids.

Preferably, the value of the buy-now cost of the item is being continuously displayed during the sale process.

Preferably, the graphical interface further comprises a particular icon for each bidder, each particular icon defining a particular identification for each bidder and including an image representing a code assigned to each bidder, wherein the identification for each bidder is assigned a particular characteristic that differs from the characteristic of any other bidder.

Preferably, the second icon that shows the highest current bid is assigned the same characteristic of the bidder that made the highest current bid displayed in the second icon.

Preferably, the particular characteristic comprises colour.

Preferably, the second activable graphics displaying the cost for buying the item now and the second icon displaying the current highest bid are displayed adjacent each other.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which:

FIGS. 8 to 14 illustrate particular instances of the bidder graphical interface during the bidding period of the sales mechanism shown in FIG. 1;

DESCRIPTION OF EMBODIMENT(S)

Figure 1:
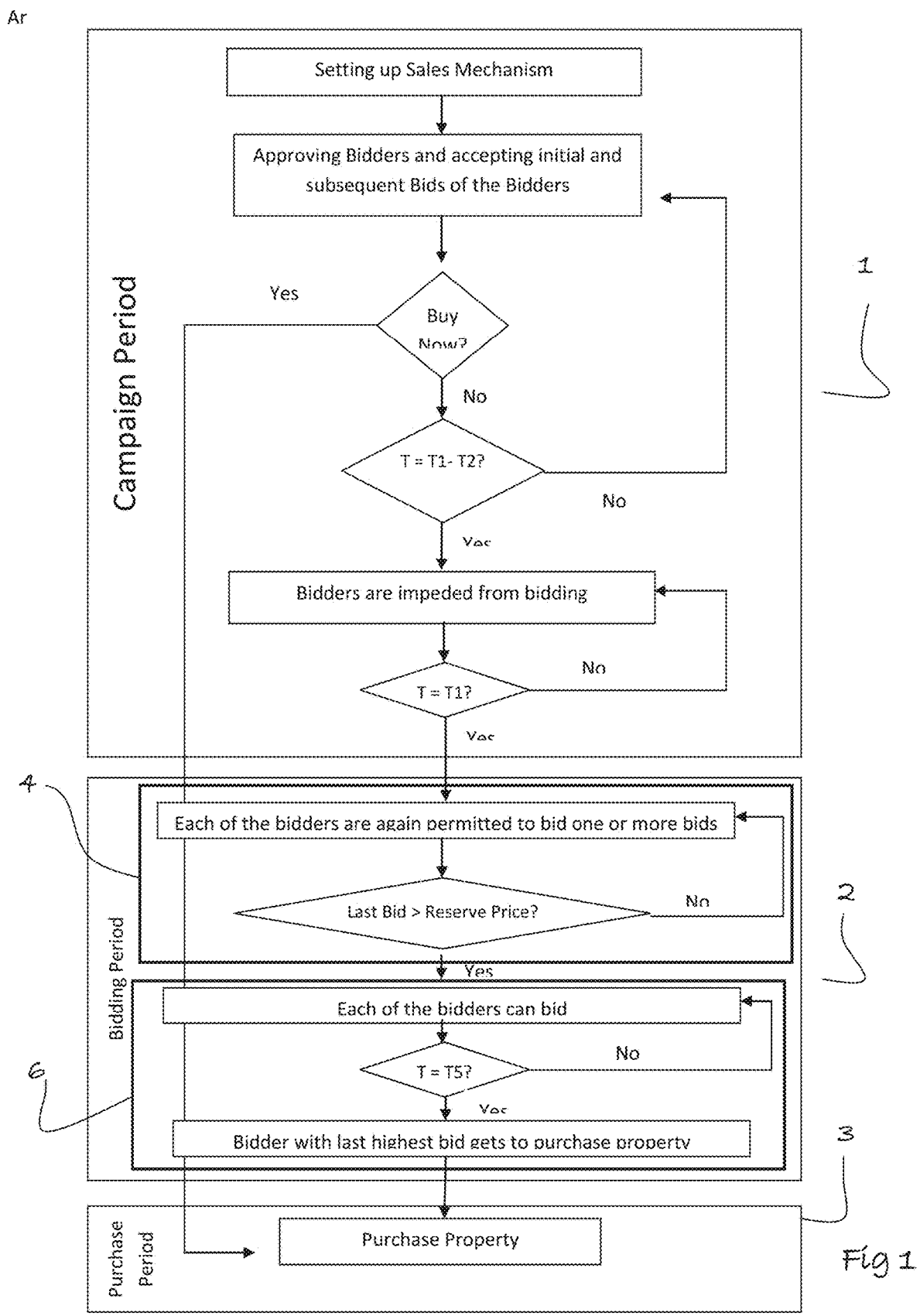
FIG. 1 illustrates a flowchart outlining a sales mechanism in accordance with an embodiment of the present invention.

The invention relates to a system 10 for conducting a sales mechanism over the internet in accordance with an embodiment of the invention.

The system 10 comprises a sales platform 18 for vendors of items such as a real estate property, sales facilitators 16 to administer the sales mechanism, and buyers (also referred to as bidders 14) to interact for selling and buying the items offered for sale. The description to follow will refer to a particular application of the sales mechanism for offering for sale a real estate property; however, the sales mechanism may be utilised for offering for sale any tangible or intangible items that is able to be sold In a particular arrangement the system 10 permits the sales facilitator 16 to set up the sales mechanism by, for example, (1) making available via a sales facilitator graphical interface 21 images of the particular items offered for sale, (2) setting up the parameters of the sales mechanism (3) registration of the participants (the bidders 14), and (4) overviewing and updating any parameter of the sales mechanism.

FIGS. 19 to 27 show images of particular instances of the sales facilitator graphical interface 21 during setting up of the sales mechanism and during operation of the sales process.

The system 10 is also adapted to provide to bidders 14 a bidders graphical interface 19. By accessing the bidders graphical interface 19, the bidders 14 may, for example (1) view the particular item that is offered for sale and (2) show an interest in purchasing the particular item by making one more bids for purchasing the particular item offered for sale and to interact with the sales facilitator 16 during the sales process.

FIGS. 5 to 15 shows images of particular instances of the bidder graphical interface 19 during the bidder's registration process into the sales mechanism and during the sales process using the sales mechanism.

Also, the bidders 14 may provide, via the sales platform 18, to the sales facilitator 16 the terms and conditions (referred to as the terms of engagement) that would become operative in the event that any of the bidders 14 would ultimately make the successful bid and acquire the item offered for sale. Provision of these term may be done over the internet by, for example, uploading writing agreements in digital format, the sales facilitator 16 or vendor 20 accepting these terms over the internet after discussion with the bidder 14 to adjust the terms of engagement to accommodate the needs and desires of all parties.

In accordance with present embodiment of the invention, any bidder 14 may provide terms and conditions of purchase that may differ from each other; this maximizes the potential audience of bidders.

Figure 2:
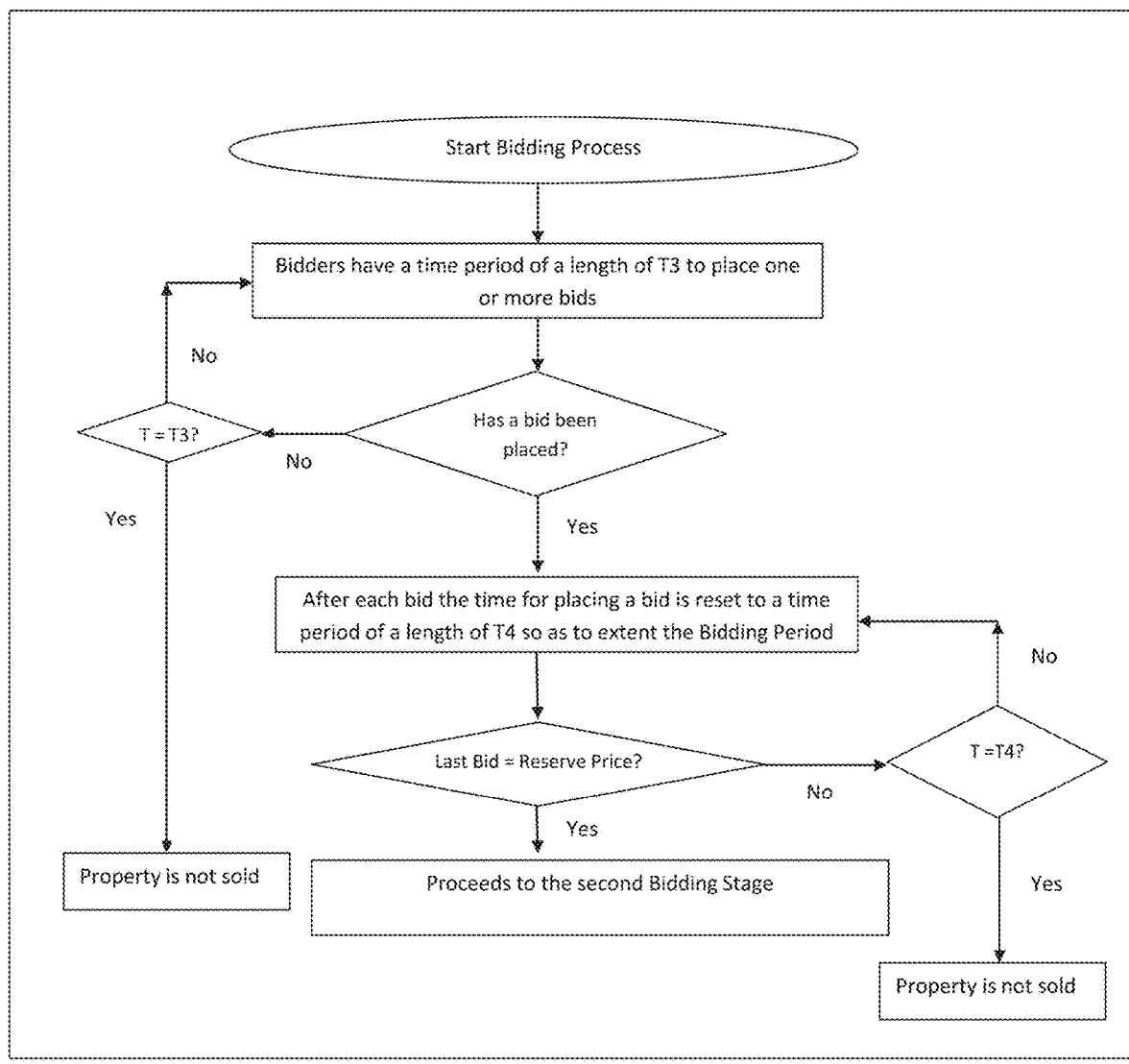
FIG. 2 illustrates a flowchart of a bidding period included in the sales mechanism shown in FIG. 1.
Figure 3:
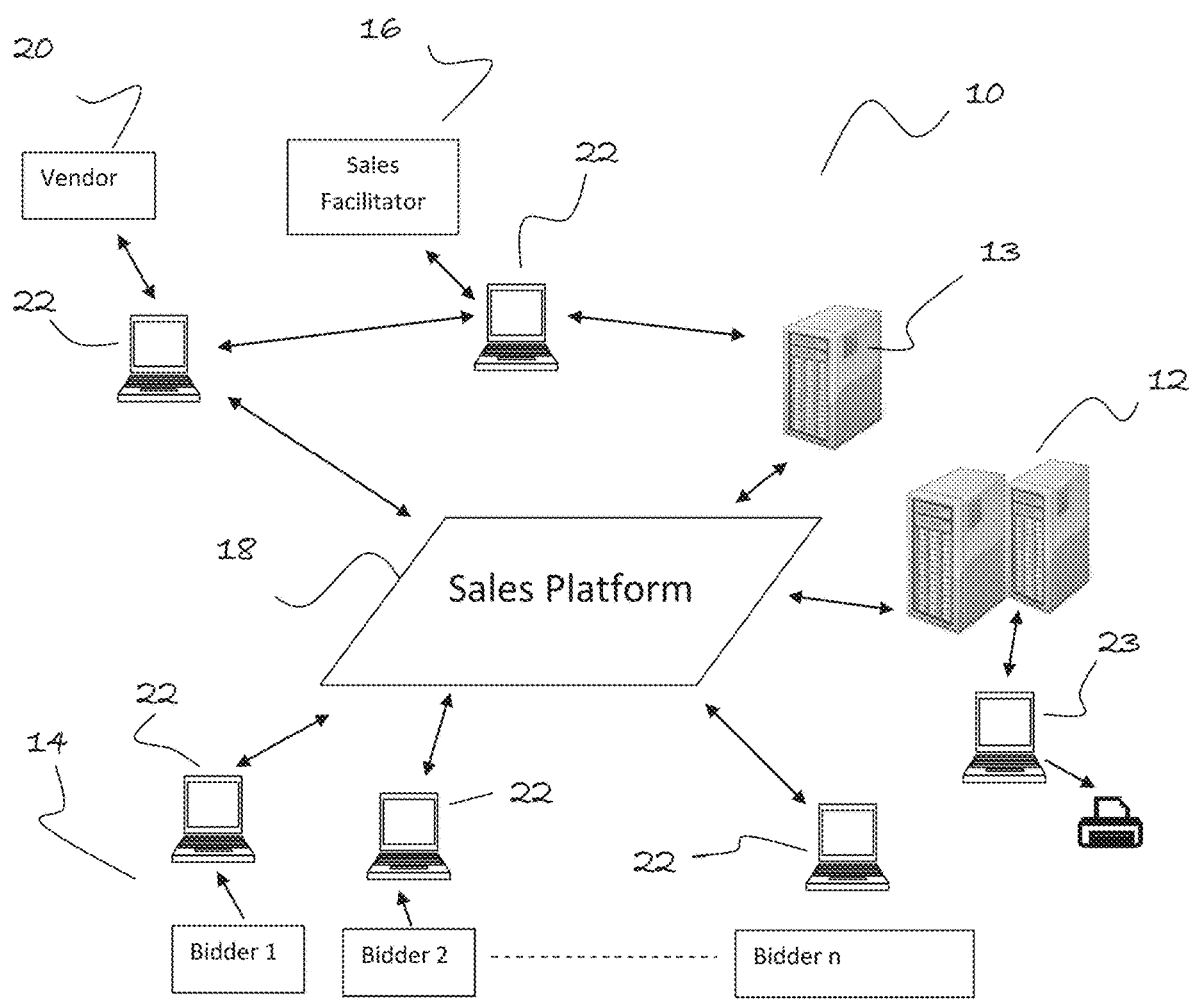
FIG. 3 illustrates a system for performing the sales mechanism illustrated in FIG. 1.

FIGS. 1 and 2 depicts two flowcharts outlining a particular arrangement of a sale process in accordance with an embodiment of the present invention to be conducted over the internet using the system 10 depicted in FIG. 3.

The sales mechanism comprises a first stage (referred to as the Campaign Period 1) a second stage (referred to us the Bidding Period 2) and a third stage (referred to as the Purchase Period 3).

The campaign period comprises the steps of (1) setting up the sales mechanism, (2) approval of bidders 14 including agreeing on the particular terms of engagement that would become operative in the event that any of the bidders 14 concerned would ultimately make the successful bid, and (3) the bidders 14 making one or more bids. Further, during the campaign period 1, the sales mechanism also includes the option (referred to as "Buy Now" option) for permitting any of the bidders 14 to purchase the item offered for sale at a particular pre-established price (the Buy-Now Price) prior commencement of the bidding period 2. The Buy-Now Price progressively decreases as time goes by and as the bids made by the bidders 14 increases in value. If a particular bidder 14 decides to purchase the property by choosing the Buy-Now option, the bidding period 2 is skipped and the purchase period commences exclusively between the particular bidder and the sales facilitator 16. If for any reason, the property is not sold, the sales process may be restarted.

The Buy-Now option may be removed at the discretion of the sales facilitator 16. For example, if the quantity of bidders 14 registering to the sales mechanism is relative large and thus, existing a relative great demand for the property) the Buy-Now option may be removed. However, the Buy-Now option may be reinstated during the campaign period if required or desired. Removal and reinstatement of the Buy-Now option may be done by the sales facilitator 16; for this, the system 10 causes the sales facilitator graphical interface 21 to allow the sales facilitator to remove or reinstate the Buy-Now option through activation of particular icons adapted to remove or reinstate the Buy-Now option when activated by the sales facilitator 16.

In alternative arrangements, the system 10 may comprise means for deciding (independently from the sales facilitator) when to remove or reinstate the Buy-Now option based on, for example, information (such as Big Data) collected from previous sales processes. These means may be based on algorithms designed to that effect.

In a further alternative arrangement, the Buy-Now option may be removed if the Buy-Now price (that is continuously decreasing during the campaign period of the sales process) shown in the icon 28 displayed in the bidder graphical interface 19 is equal to the Buy-Now end price.

In another arrangement, there may also be provided an option for the sales facilitator 16 to commence the bidding period prior the end of the campaign period 1 should a particular offer for purchasing the item be received. The particular offer may be, for example, a bid that is equal to or greater than the reserve price. The reserve price is a specific price of the item to be offered for sale set by the vendor 20 and/or the sales facilitator 16; for example, the reserve price may be the minimum price of the item that is being offered for sale at which the item will be sold.

In the particular arrangement described in the previous paragraph, the campaign period 1 may be stopped and the bidding period 2 is started upon the sales facilitator 16 and/or the vendor 20 discretion. However, in contrast, in the particular arrangement shown in FIG. 1, the campaign period 1 occurs within a pre-set time frame $T_1$ (the first time period $T_1$). The vendor 20 and/or the sales facilitator 16 may decide the duration of the first time period ($T_1$) prior setting up of the sales mechanism by the sales facilitator 16. The first time period may more than a week or a month depending on, for example, the demand of the particular property to be sold.

Further, during the campaign period 1, the bidders 14 may make as many bids as desired; however, in the particular arrangement shown in FIG. 1, the bidders 14 are impeded from bidding for a pre-set time frame $T_2$ (the second time period) prior commencing of the bidding period 2. The presence of this second time frame $T_2$ may be particularly advantageous because it allows each bidder 14 to review the bids that have been made by all bidders (and that are visible to each bidder 14 through the bidder graphical interface 19) to, for example, asses her/his position and review in greater detail the particular property that is being offered for sale before going to the next stage, which is the bedding period 2. In an arrangement, the second time period may be 2 minutes.

As mentioned before, upon lapsing of the second time period $T_2$, the bidding period 2 commences and the bidders 14 are permitted to make bids again. As shown in FIG. 1, the bidding period 2 comprises a first bidding stage 4 and a second bidding stage 6.

FIG. 2 illustrate the first bidding stage 4.

As shown in FIG. 2, the first bidding stage 4 permits the bidders 14 at the end of the campaign period 1 to increase their bids with respect to the value of their last bid. In this first bidding stage 4, the bidders are allowed to bid during the duration of a third period of time $T_3$; upon lapsing of the third period of time T3 and no bid has been place, the property may either (1) not be sold or (2) be sold to the bidder 14 with the highest bid at the end of the campaign period 1. However, it is expect that upon commencement of this first bidding stage 4, the bidders 14 will bid with the objective of purchasing the property. In an arrangement, the third time period may be 5 minutes.

In particular, it is expected that during the first bidding stage 4 one of the bids made by a particular bidder 14 will be equal or greater than the reserve price.

In a particular arrangement, the time period set for the first bidding stage 4 to laps (that initially is the third period of time $T_3$ mentioned in the last paragraph) is reset to a fourth time period of time $T_4$; resetting of time period occurs each time a bid is made by one of the bidders 14. In this manner, the first bidding stage 4 may be extended beyond the third period of time $T_3$ until a bid of a particular bidder 14 is equal or greater than the reserve price. In an arrangement, the fourth time period may be 2 minutes.

In the event where a bid made by a bidder 14 is equal or greater than the reserve price, the second bidding stage 6 commences as illustrated in FIG. 1.

In accordance with a particular arrangement, upon a particular bid being equal or greater than the reserve price, a notification is issued to the bidders 14 and to the Sales facilitator. The notification includes information regarding the fact that the reserve price has been met and the item is on the market and will sell. For example, a notification may in the form of a pop-up window 76 (such as a red banner shown in FIGS. 12 to 14 and FIGS. 27*b* and 27*c*) being displayed in a graphical interface of a computing or communication device having installed therein an app of the sale mechanism. Upon appearing of the notification, the second bidding stage 6 commences.

In the second bidding stage 6, all bidders 14 have an opportunity to bid; however, no bidder 14 can bid against her(him)self by submitting consecutive bids. The duration of the second bidding stage 6 is pre-set to be a fifth period of time $T_5$. This pre-set time period may not be extended;

however, the second bidding stage 6 may be paused by the sales facilitator 16. Pausing of the second bidding stage 6 may occur to, for example, vary the amount that each bidder 14 may increment its earlier bid. This can be seen in FIGS. 12b and 13.

After lapsing of the sixth period of time T6, the second bidding stage 6 is stopped and the bidder 14 with the highest bid (the winning bidder 14) purchases the item through during the Purchase Period 3.

In an arrangement, in the event that the winning bidder 14 does not purchase the item, the other bidders 14 will be contacted in the order of the last bids; this is, other bidders 14 will be contacted in accordance with the value of their bid from the second highest bid to the lowest bid.

Figure 4:
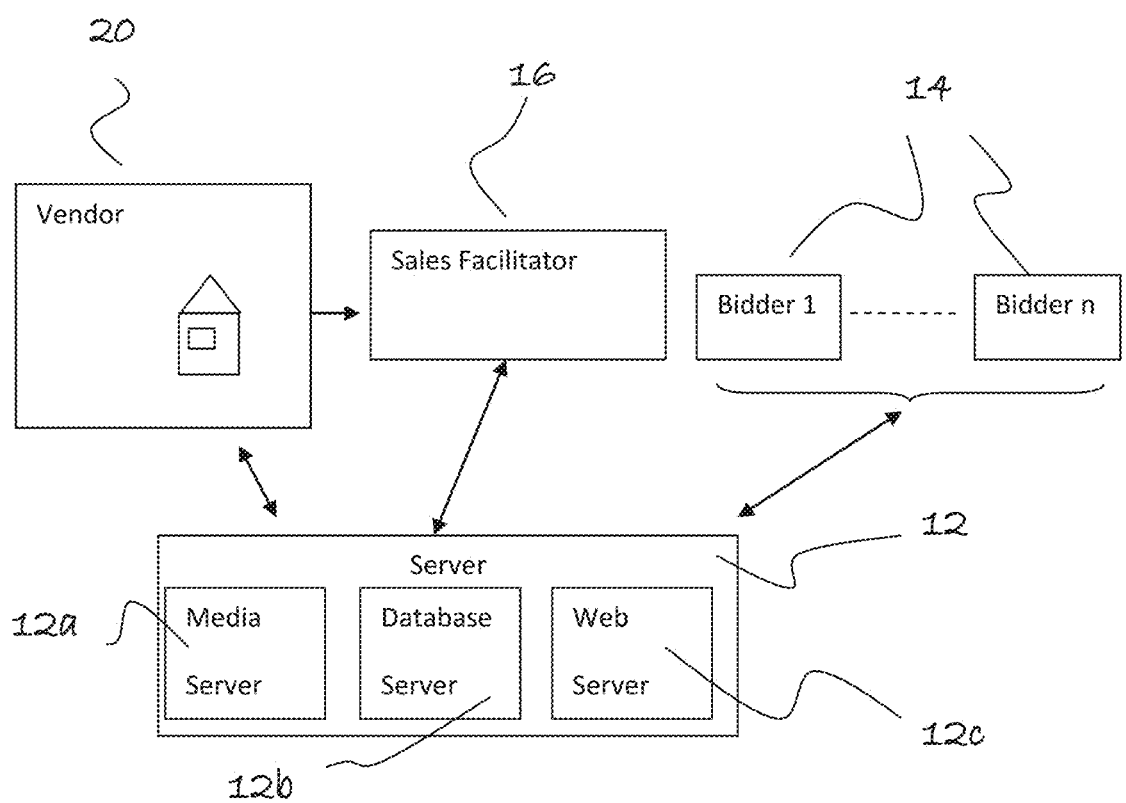
FIG. 4 illustrates a system for setting up the sales mechanism shown in FIG. 1.

Referring now to FIGS. 3 and 4.

FIG. 3 illustrates an online, real-time system for conducting a sales mechanism according to the present embodiment of the invention.

The system 10 includes a server 12 including software for running the Sales Platform 18 and one or more computer processors, such as one or more commercially available Central Processing Units (CPUs) in the form of one-chip microprocessors, coupled to a communication device configured to communicate via a communication network. The communication device may be used to communicate, for example, with one or more of the remote devices 22 and 23 as well as server 13 adapted to communicate with the remote device 22 of the sales facilitator 16 and the bidders 14.

The Sales Platform 18 further comprises input devices (for example, a mouse and/or keyboard to enter persona details among other) and an output device (for example, a computer monitor to display reports and/or aggregated results to an administrator and permit the administrator to manage and control the sales platform 18 and a printer 25 for printing of reports and any valuable information).

Further, the system 10 includes computing means having data sharing software program installed and/or directly integrated within the system 10. The computing means comprise electronic devices that include the laptops 22 and 23 (or PC and similar computing and communication devices such as mobile phones) and servers 12 and 13. The computing means each include at least one CPU and operating system, RAM, ROM storage and TCP/IP adapter card. Computing means are each coupled to input and output (I/O) devices through an I/O interface. The I/O interface includes any system for exchanging information to or from an external device. I/O devices include any known type of external device such as a display device (e.g., monitor including touch-screens), keyboard, mouse devices, printer, speakers, handheld device, facsimile, microphone, or webcam.

The Sales Platform 18 further includes database farms incorporated in the serves 12 and 13. The database farms store information required for the sales platform 18 to generate the graphical interfaces such as 19 and 31, running the sales process and issuing reports.

The server 12 comprises a media server, a database server, and a web server shown in FIG. 4. In alternative arrangements the media, database and web servers may be virtualized on one or more physical servers, or may all be performed by a single server.

The media server receives and stores images, video and/or audio taken by a media device by, for example, the sales facilitator 16 of the item offered for sale. This allows the bidders 14 to visualise the item to be sold through, for example, a website interface 18. In particular arrangements, video images and audio signals of the sales facilitator 16 during a particular sales mechanism may be provided to the media sever for storage therein to allow visualization of a live sales mechanism by the bidders 14 through the website interface 18.

The web server generates a graphical interface 21 for the sales facilitator 16 to, for example, (1) setting up the sales mechanism and interact with the bidders 14 during, for example, registration of the bidders 14 prior commencement of the bidding process and (2) for controlling the progression of the bidding process.

Further, the web server also generates a graphical interface 19 for the bidders 14 for, for example, registration purposes, viewing images of the item offered for sale and for participating in the bidding process. In alternative arrangements, the bidder graphical interface 19 may be generated by a software application (referred to herein as app) installed in a portable computing and communication device of all participants of the sales mechanism.

The data base server stores data of the sales mechanism (e.g., bid data, user names, passwords, account information, item offered for sale data, etc.) provided by the web server prior and during the sales mechanism.

The graphical interfaces 19 and 21 are generally served by the web server. Images, video, and audio from the media server may be downloaded or streamed by the bidders 14 directly from the web server (e.g., the downloaded webpage providing embedded media from the media server's address).

The sales facilitator 16 and the bidders 14 interact with the sales platform 18 via computing device adapted for sending and receiving data with the website 18. The computing devices comprise (1) processors adapted to execute code or other instructions and communicate over LAN/WAN; (2) a display for displaying graphical user interfaces such as the website 18; (3) an input device such as keyboards, touch screens or mouse devices. Each of the computing devices are adapted to operate a web browser for displaying the website interface 18 of the system 10 for conducting the sales mechanism. Alternatively, the computing devices 22 (such as a cellphone) may be adapted to use stand-alone applications (apps) that have been downloaded from the webpage of the sales mechanism and installed in the computing device 22.

The computing devices 22 may be any of, for example, a personal computer, a cellphone and a laptop.

As mentioned before, the system 10 allows a sales facilitator 16 to set up a sales mechanism to allow a plurality of bidders 14 to participate in the sales mechanism via the website interface 18.

In alternative arrangements, the system 10 may be adapted to conduct a real-time sales mechanism spanning a particular period of time. The real-time sales mechanism may be conducted with a plurality of remote bidders viewing simultaneously a graphical interface 19 (or the app interface displaced in their cellphones) and participating remotely in the live sales mechanism. For this, the sales facilitator 16 may use a camera for filming the live sales mechanism by recording video and audio signals of the sales mechanism and provide the video and audio signals to the media server for display on the website 18 for viewing by the bidders 14.

Furthermore, the vendor 20 of the item offered for sale may directly communicate with the sales facilitator 16 via a computing device 22 to provide images and details of the item offered for sale. Alternatively, the vendor 20 may communicate with the sales facilitator 16 via the sales platform 18 though a particular graphical interface generated by the web server; for this the vendor 20 may logon on the vendor's interface of a vendor graphical interface for storing the image and details of the item offered for sale in the media server of the server 12 to permit the sales facilitator 16 and the bidders 14 to view the image and details of the item offered for sale via the website 18 prior to the bidding process. The server 12 may generate particular instances of graphical interfaces being displayed on screens of computers, laptops or mobile phones having installed therein an app of the sale mechanism. These graphical interfaces (the sales facilitator, bidders and vendor graphical interfaces) permit the sales facilitator 16, vendor 20 and the bidders 14 to interact with the system 10 via keyword, mouse or touch-screens for activating particular icons shown in the graphical interfaces to provide instructions and issue requests to the system 10 during operation of the sales mechanism.

In an arrangement, there is provided the step of permitting the sales facilitator to pause the sales mechanism.

Referring now to FIGS. 5 to 15.

FIGS. 5 to 15 show particular instances of the bidder graphical interface 19 during the sales process of the item offered for sale; in particular, the sales process of real estate property (referred to as the property).

In the particular arrangement shown in FIGS. 5 to 15 the bidder graphical interface 19 is showed in a display of mobile phone via an app installed in the mobile phone of the bidders 14.

As will be described with reference to FIGS. 19 to 27, the sales facilitators 16 may set up the sales mechanism and overview the sales mechanism via a graphical website interface 21 showed in a display of a computing device or a mobile phone having installed an app of the sales mechanism. Similarly, the vendor 20 may overview the sales process together with the sales facilitator 16 or the vendor 20 may remotely overview the sales process via a computing device or an app installed in a cellphone in, for example, the privacy the vendor's home.

As was mentioned before, the sales mechanism in accordance with the present embodiment of the invention includes a campaign period 1 that includes the steps of setting up the sales mechanism.

The step of setting up the sales mechanism is illustrated in FIGS. 19 to 22.

Setting up the sales mechanism comprises providing to the web server 12 digital files representing the images 50 and details 52 of the property 50 to be sold in order for the bidders 14 to view via the graphical bidder interfaces 19. This process is referred to as Create Property. Provision of the images 52 and details 52 may be conducted by the vendor 20 or sales facilitator 16 through their respective graphical interfaces by uploading the digital files from the web server of the system 10.

Figure 19:
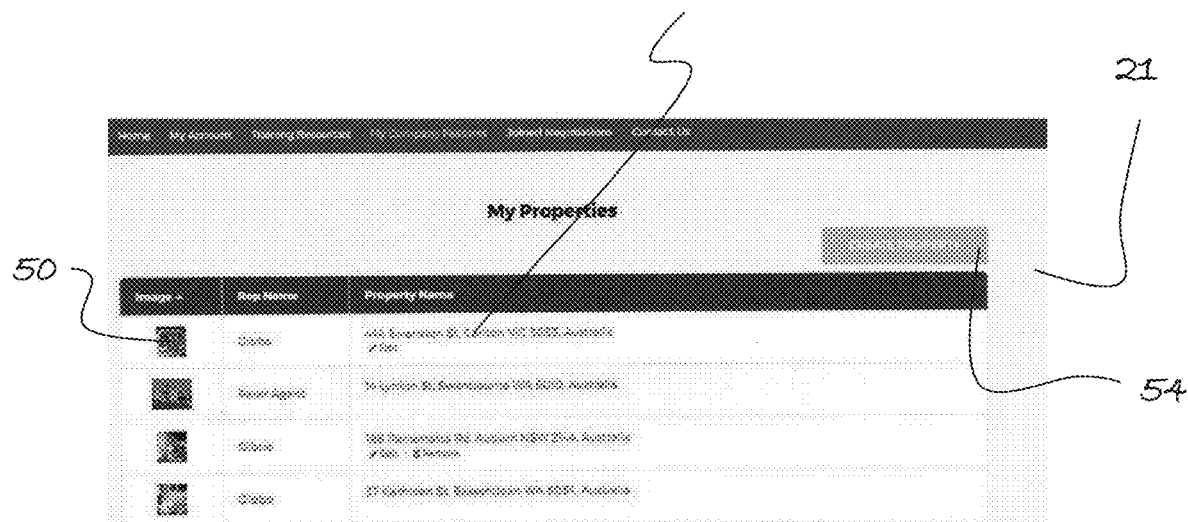
FIGS. 19 to 20 illustrate two particular instances of the sales facilitator graphical interface for permitting creating one or more properties to be offered through the sales mechanism.
Figure 20:

The particular instances of the sales facilitator graphical interface 21 for uploading the digital files are shown in FIGS. 19 and 20. In particular, the instance of the sales facilitator graphical interface 21 shown in FIG. 19 permits commencing the process for uploading the digital files by activating the icon 54 so as to generate the interface of the sales facilitator graphical interface 21 shown in FIG. 20. Activation of the icons 56 allows the sales facilitator to upload onto the server 12 the digitals files so that the bidders 14 may view them through their graphical interfaces 19.

Further, after creation of the property it is necessary setting up the sales mechanism. Setting up the sales mechanism comprises inputting the parameters that are required for operation of the sales mechanism. Examples of these parameters are: the time periods $T_1$ to $T_5$, reserve price, Buy-Now start and end prices, and the bid increment and the maximum single bid that a bidder 14 may make each time.

Figure 21:
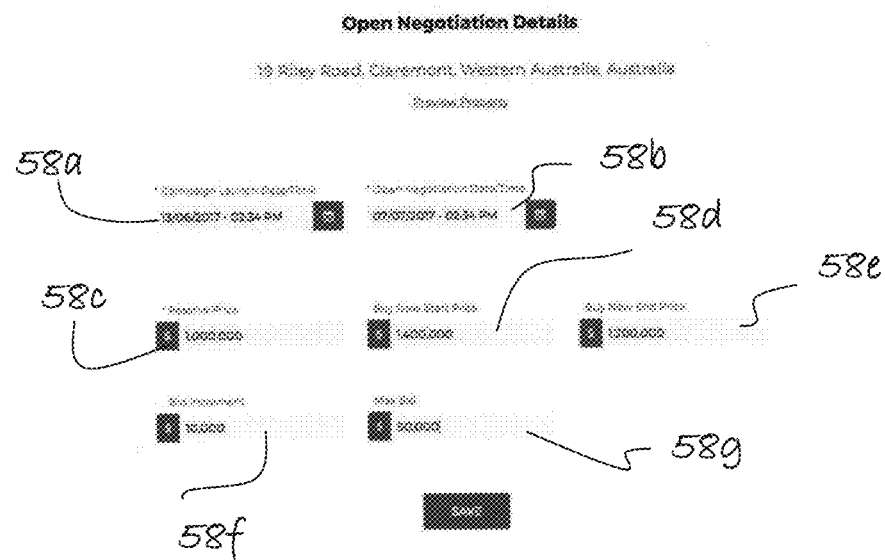
FIG. 21 illustrates a particular instance of the sales facilitator graphical interface for setting the value of particular parameters of the sales mechanism.
Figure 22:
FIG. 22 illustrates a particular instance of the sales facilitator graphical interface for uploading onto a server of the system shown in FIG. 3 digital information of one or more properties to be offered through the sales mechanism and payment of corresponding fees.
Figure 23:
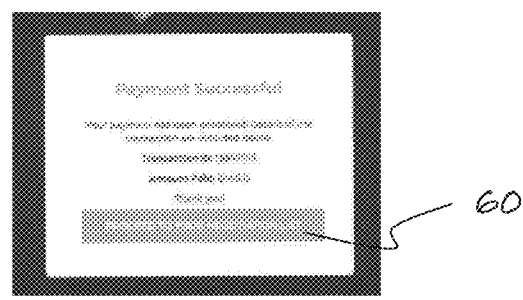
FIG. 23 illustrates a particular instance of the sales facilitator graphical interface confirming uploading of the digital information and that payment has been successful.
Figure 24:
FIG. 24 illustrates a particular instance of the graphical users interface listing the one or more properties offered through the sales mechanism.

A particular arrangement of an instance of the sales facilitator graphical interface 21 is shown in FIGS. 21 and 22. Inputting of these parameters may be done via text boxes 58 as shown in FIG. 21 such as drop-down text boxes permitting the sales facilitator to choose the appropriate value of the parameter from the drop-down list. The time period $T_1$ may be entered by entering in two textboxes 58a and 58b the start date and time of the Campaign Period 1 and the end date and time of the Campaign period 1. The time periods $T_2$ to $T_5$ may be entered via drop-down text boxes permitting the sales facilitator to choose the appropriate value of the parameter from the drop-down list.

Furthermore, the text box 58c permits inputting the reserve price (this is the particular price at which the property will sell) Once inputted the reserve price is kept confidential impeding the bidders 14 to find out the amount of the reserve price.

After, creating the property and inputting the parameters for operation of the sales mechanism, the sales facilitator 16 finishes the process of setting up the sales mechanism by payment of any fees for using the sales mechanism. This is done through the arrangement of an instance of the sales facilitator graphical interface 21 shown in FIG. 22. The instance of the sales facilitator graphical interface 21 shown in FIG. 23 confirms that payment has been successful and provides the corresponding confirmation details; this particular instance comprises a button 60 that by activating it generates the instance of the sales facilitator graphical interface 21 listing all property that has been created by the particular sales facilitator 16. The listing 59 includes an image 62 of the property, the representative and property name and the status of each sales process for each property listed therein.

Figure 25A:
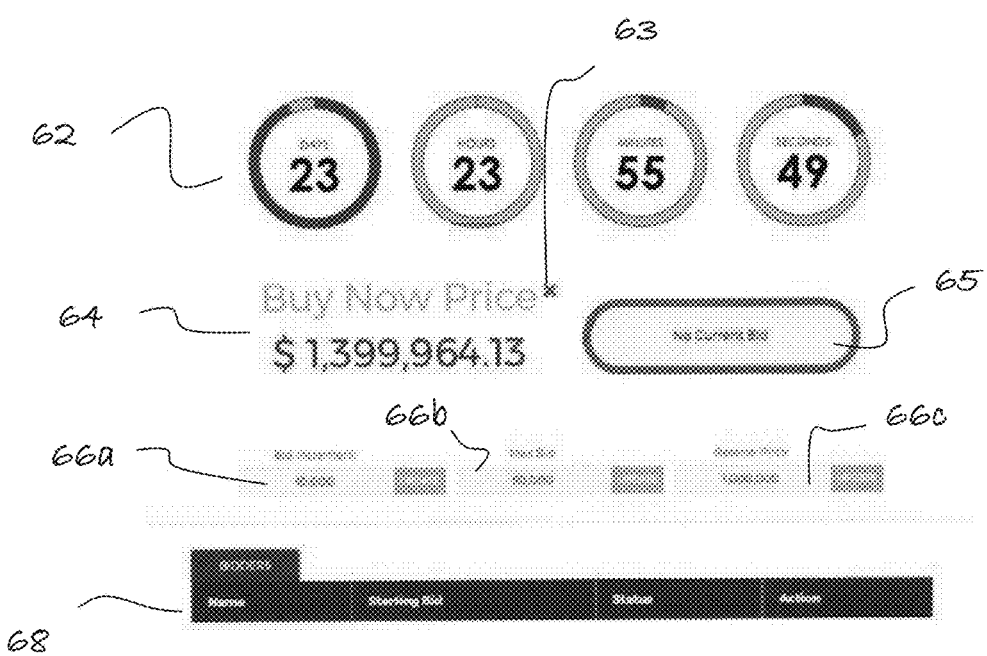
FIGS. 25a to 25g illustrates particular instances of the sales facilitator graphical interface permitting the sales facilitator to accept or reject one or more bidders.
Figure 25B:
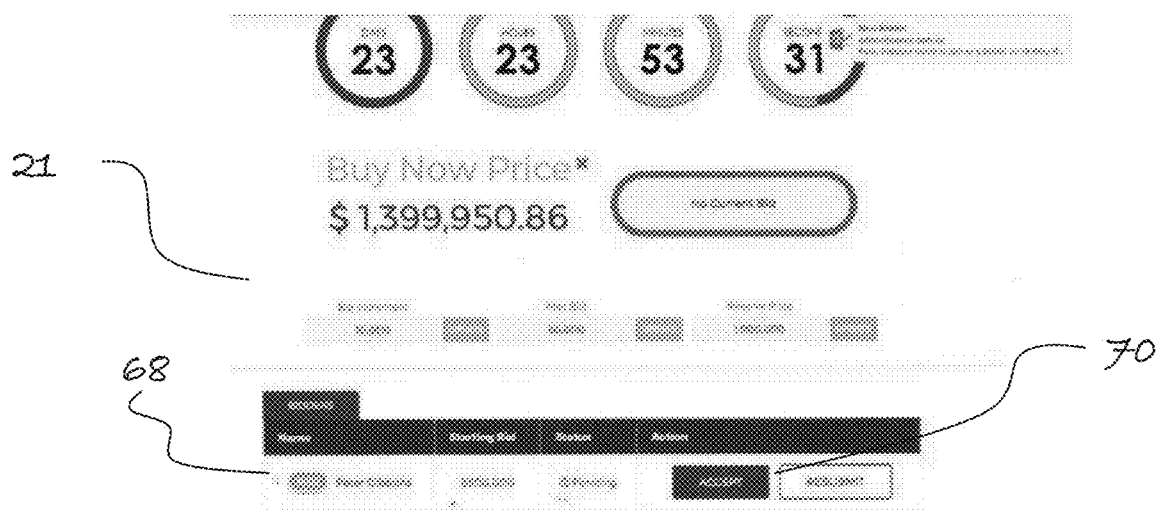
Figure 25C:
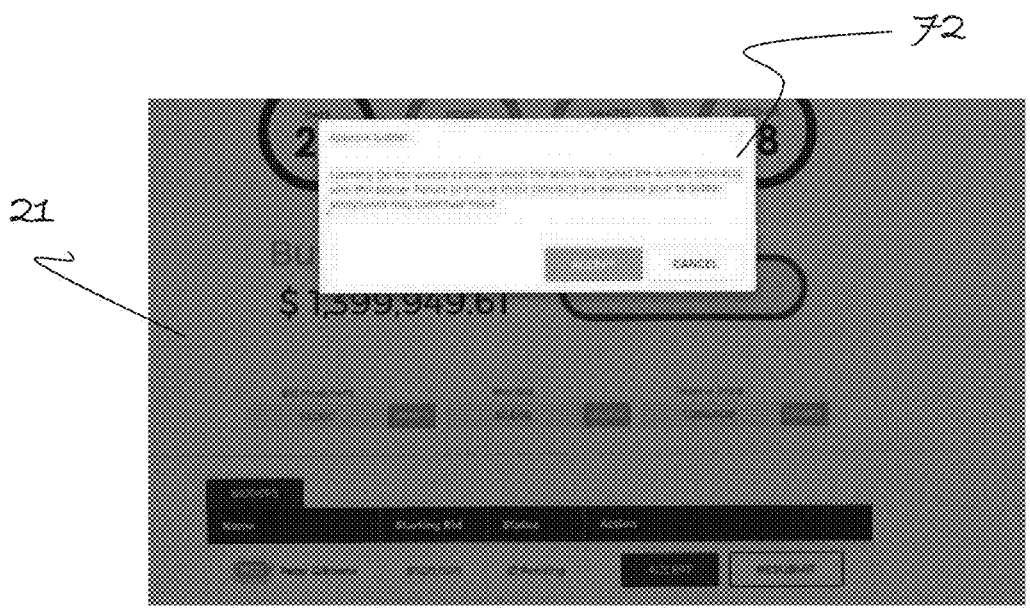
Figure 25D:
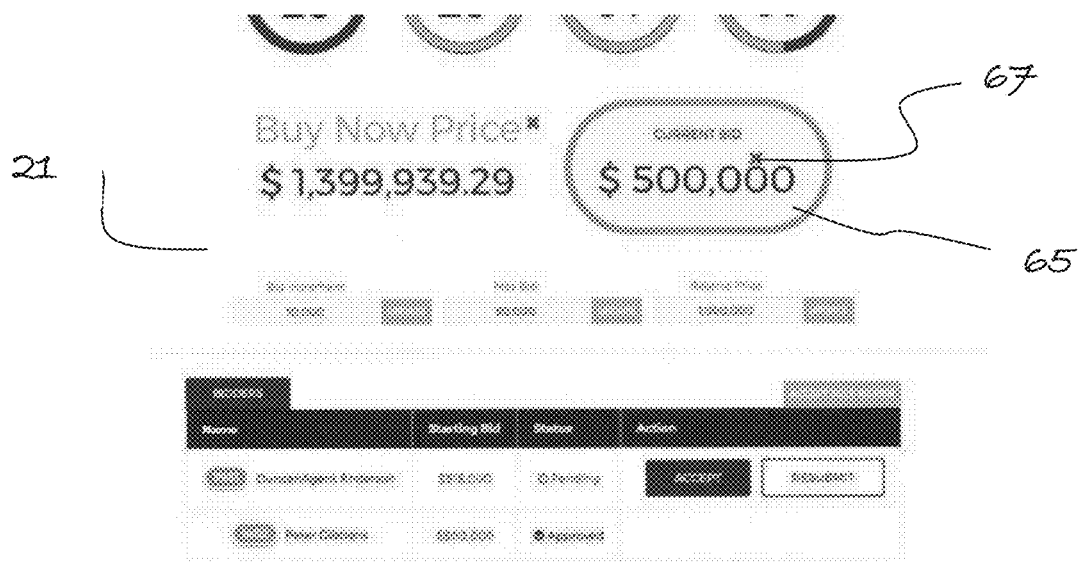
Figure 25E:
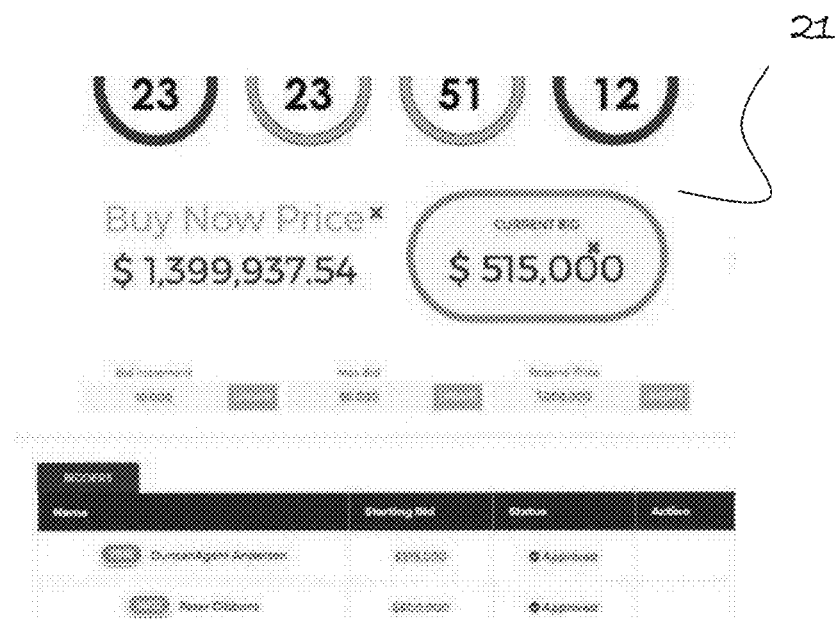
Figure 25F:
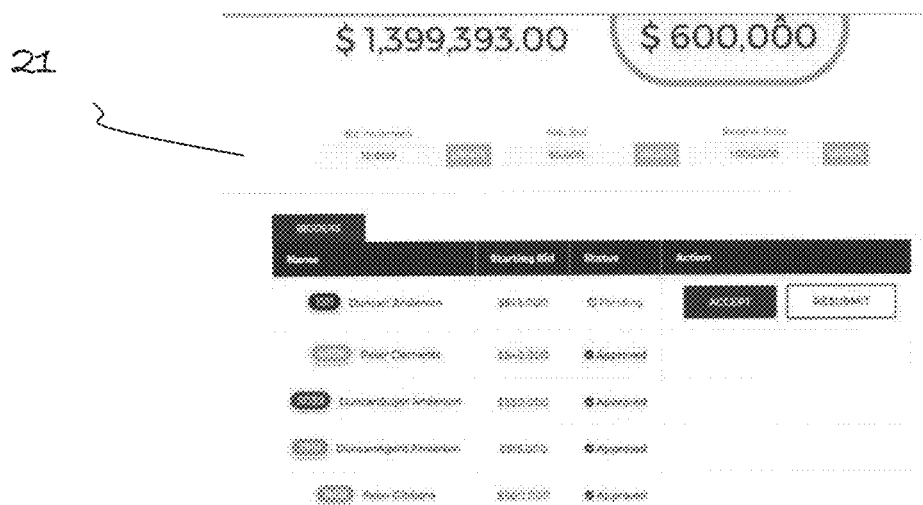
Figure 25G:
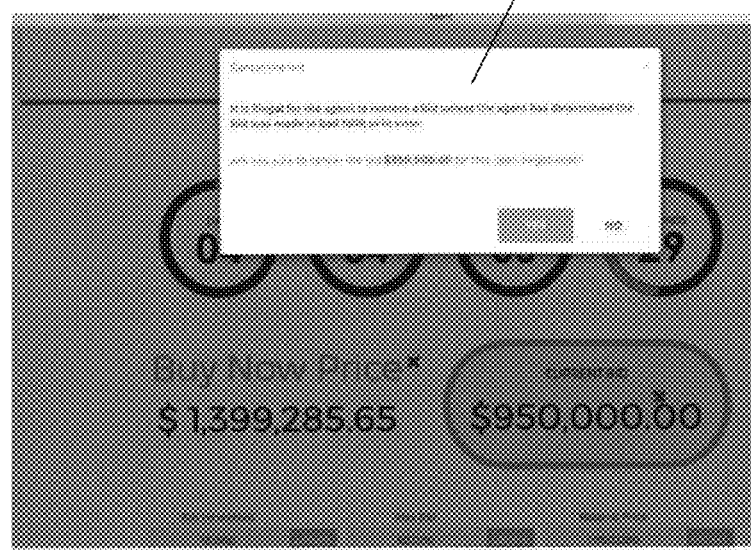
Figure 26:
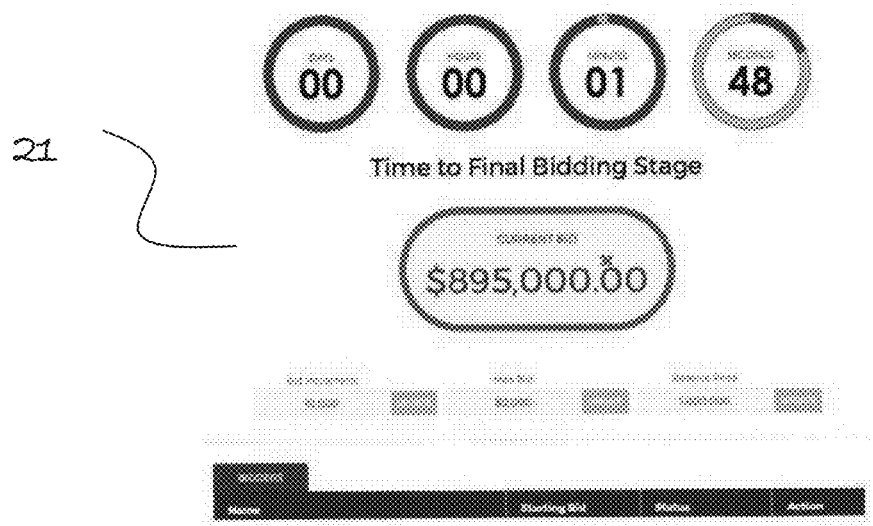
FIG. 26 illustrates a particular instance of the graphical sales facilitator's interface notifying the sales facilitator that the campaign period has finalised and that within a particular time period the bidding period will start.

Referring now to FIGS. 25 to 27, FIGS. 25 to 27 illustrates particular instances of the sales facilitator graphical interface 21 that are displayed in the screen of sales facilitator's remote device 22.

The particular instances of the sales facilitator graphical interface 21 shown in FIGS. 25 to 27 include icons adapted to provide information related to the current status of the sales process.

As shown in FIG. 25a, the particular instances of the sales facilitator graphical interface 21 may include: (1) one or more icons 62 indicating the value of the time periods $T_1$ (where i is any number 1 to 5). In the instance shown in FIG. 25a, the icons 62 including count-down timers indicate the time left before the campaign period 1 finishes; (2) an icon 64 shows the Buy-Now price; (3) an icon indicating the value of the current bid or if any bid has been already made by one of the bidders 14; one or more icons indicating the values of some of the parameters used for operation of the sales mechanism such as bid increment, maximum bid and the reserve price; and (4) a table listing the bidders 14 with information related to the value of the starting bid, status and a column including one more icons 70 (see FIG. 25b) for each bidder 14.

The icon 28 showing the buy now price in the bidder's graphical interface may be removed by the sales facilitator by activating the activable graphics 63 included in the icon 64 showing the Buy Now price—see FIGS. 25a.

FIG. 25b shows one instance of the sales facilitator graphical interface 21 after a first bidder 14a (code 1402) has requested to participate in the sales process by providing the terms of engagement and a starting bid. As shown in FIG. 25b, a pop-up window 69 appears on the sales facilitator graphical interface 21 notifying the sales facilitator 16 that a bidder 14a has requested participation in the sales process by submitting a starting bid of 500,000 and the terms of engagement. Also, the table 68 is updated by the system 10 to include—in the tables last column corresponding to the row of each bidder 14—two icons: (1) a first icon which when activated it permits accepting the bidder 14 and another icon which when activated permits requesting the bidder 14a to re-submit, the terms of engagement and/or to replace the starting bid with another starting bid.

FIG. 25c shows the particular instance of the sales facilitator graphical interface 21 after, the sales facilitator 16 has activated the icon 70 that is labeled "Accept". As shown in FIG. 25c, a pop-window 72 appears alerting the sales facilitator 16 that any bidders 14 may only be accepted after the bidder 14 having signed the corresponding written contracts.

FIGS. 25d to 25g shows particular instances of the sales facilitator graphical interface 21 during the campaign period 1 in which bidders 14 are requesting participation in the sales process and the sales facilitator is accepting new bidders 14 or requesting the new bidders to resubmit the new bidder's request.

In an arrangement, the sales facilitator 16 may remove a bid made by a particular bidders 14 if the sales facilitator considers that the bid is erroneous or has been made in bad faith. Removal of the bid may conducted via the activable graphics 67 included in the icon 65 showing the current bid—see FIG. 25d. In the event that a bid is removed, a pop-window 74 appears alerting the sales facilitator 16 that it is illegal to remove a bid unless the bid is erroneous or has been made in bad faith—see FIG. 25g. Also, removal of a bid causes a notification to the bidders 14 that the current bid has been removed and that the current bid prior to the making of the removed bid is now again the current bid.

Referring now to FIG. 26, this figure shows a particular instance of the sales facilitator interface 21 during the final stage of the campaign period in which no bidders 14 are permitted to make a bid.

Further, as mentioned before after finalization of the campaign period 1, the bidding period 2 commences. FIGS. 27a to 27d show a particular instance of the sales facilitator interface 21 during the bidding period 2.

Figure 27A:
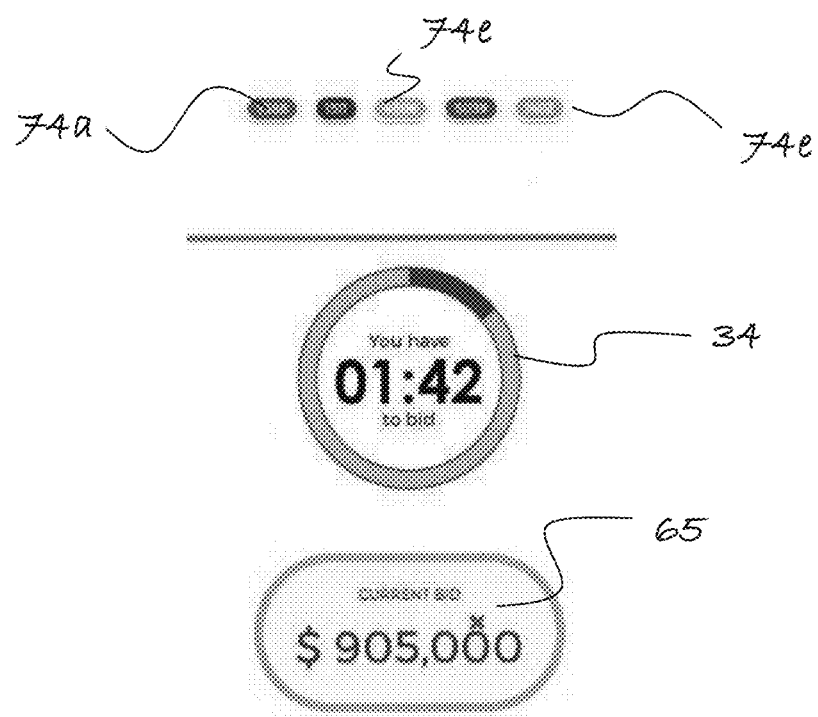
FIGS. 27a to 27d illustrates particular instances of the sales facilitator graphical interface during the bidding process.

In particular, FIG. 27a, shows the instance of the sales facilitator interface 21 of the first bidding stage 4 when there are 1:42 minutes left for the bidder to make a bid. This particular instance of the sales facilitator interface 21 shows a plurality of icons 74 (also referred to as paddles) representing each of the bidders 14 that are participating in the bidding period 2 and the icon 65 indicating the value of the current bid 65. Further, as mentioned before, at the moment when the last made bid is equal or greater than the reserve price, the second bidding stage 6 commences. At this stage, the bidders 14 have a period of time $T_5$ to make one or more bids. Also, once the reserve price has been met, a pop-window 76 appears in the sales facilitator graphical interface 21 alerting the sales facilitator 14 that the reserve price has been met.

Figure 27B:
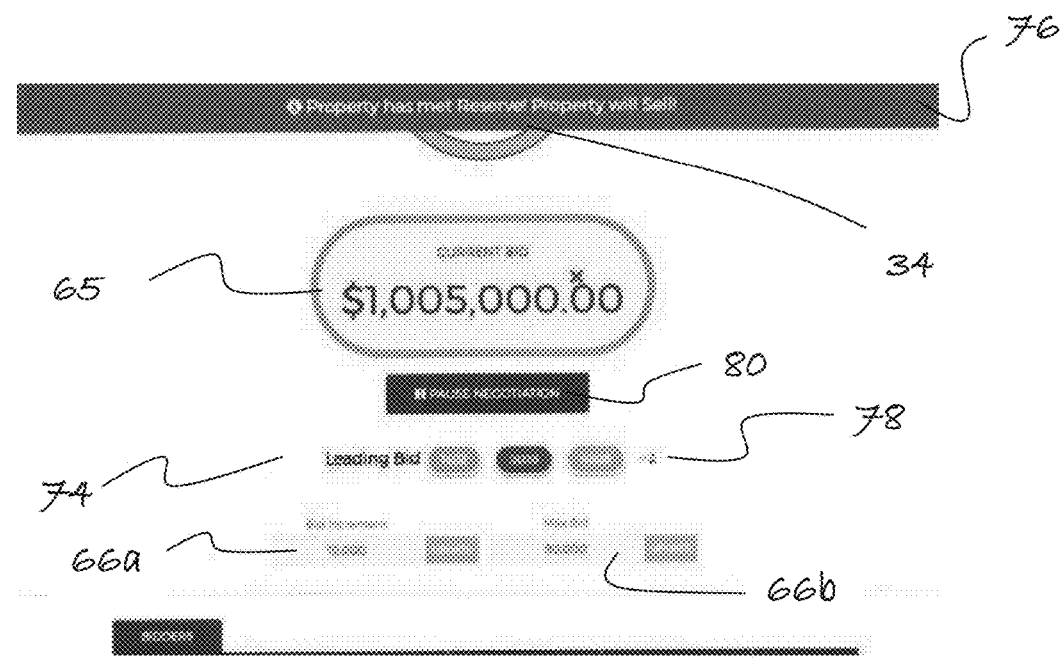
Figure 27C:
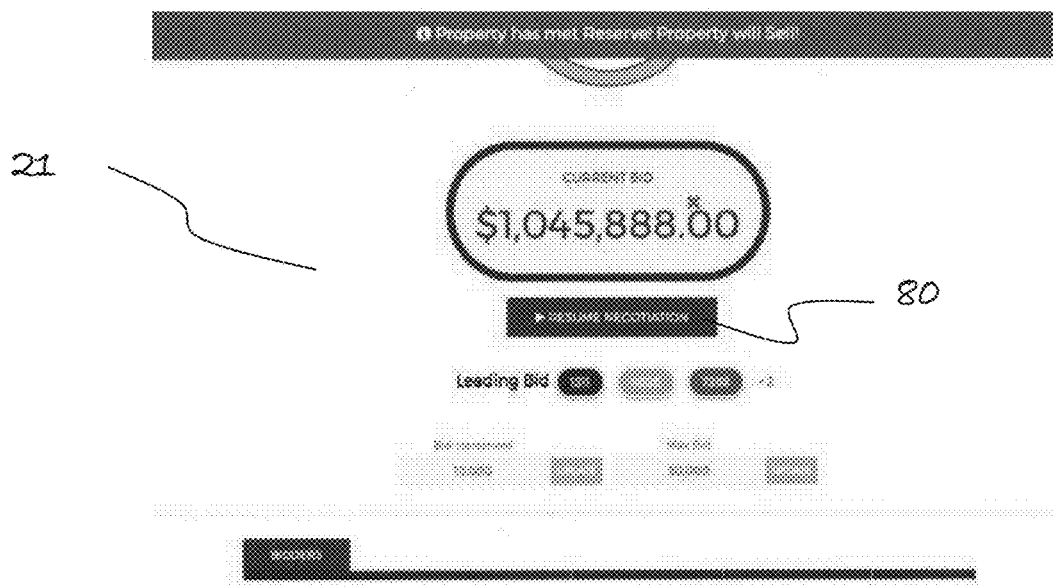
Figure 27D:
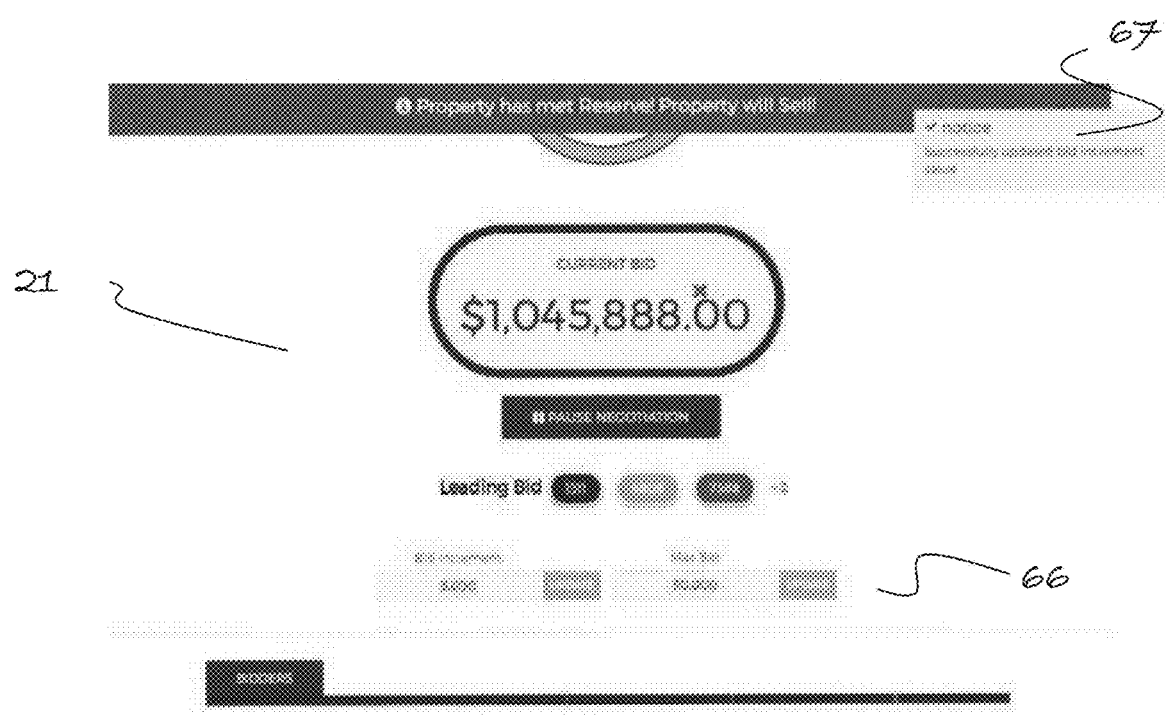

FIGS. 27b to 27d show particular instances of the sales facilitator graphical interface 21 during the second bidding stage 4. As shown in these figures, the instances of the sales facilitator graphical interface 21, comprises (1) the countdown icon 34 showing the time left for bidding, (2) the icon 65 indicating the current bid, (3) the icons 74 identifying the leading bidders 14 and an icon 78 indicating the number of bidders 14 not counting the leading bidders 14, and (4) icons 66a and 66b that show the values of the bid increment and the maximum bid possible.

As shown in the FIG. 27d, the icons 66 are icons that may be activated by pushing the area labeled as "Update" to either increase or decrease the bid increment and maximum bid. After updating a notification appear indicating that the update has been successful.

Further, the particular instances of the sales facilitator graphical interface 21 shown in FIG. 27 also comprises an icon 80 adapted to pause the bidding stage 6 and to resume the bidding stage 6. The sales facilitator 16 may pause the bidding stage 6 as shown in FIG. 27b and subsequently resume the bidding stage 6 as shown in FIG. 27b.

As mentioned before, the system 10 is also adapted to generate a bidder graphical interface 19 that permits interaction of the bidders 14 with the system 10 to participate in the sales process. FIG. 5 to 15 illustrates particular instances of the bidder graphical interface during the sales process.

Referring now to FIGS. 5 to 15 showing the instances of the bidders graphical interface 19. These instances may be viewed by a particular bidder 14 on her/his remote device 22 (such as a computer or mobile) during the bidding process.

For the bidders 14 to participate in the sales mechanism, each bidder 14 requires to interact with the graphical interface 19 (for example, the touchscreen of their mobile phone or tablet) by touching particular sections.

For registering, the bidders 14 need to touch the area of the touchscreen (including an activable icon) that changes the current instance of interface to the instance of the bidder graphical interface 19 that permits the bidders 14 to provide the information required for registration at the sales mechanism graphical interfaces Also, at this stage each bidder 14 (separate from the other bidders 14) proceeds to agree with the vendor 20 (preferably through the sales facilitator 16) the terms of engagement for purchasing the property.

Figure 5A:
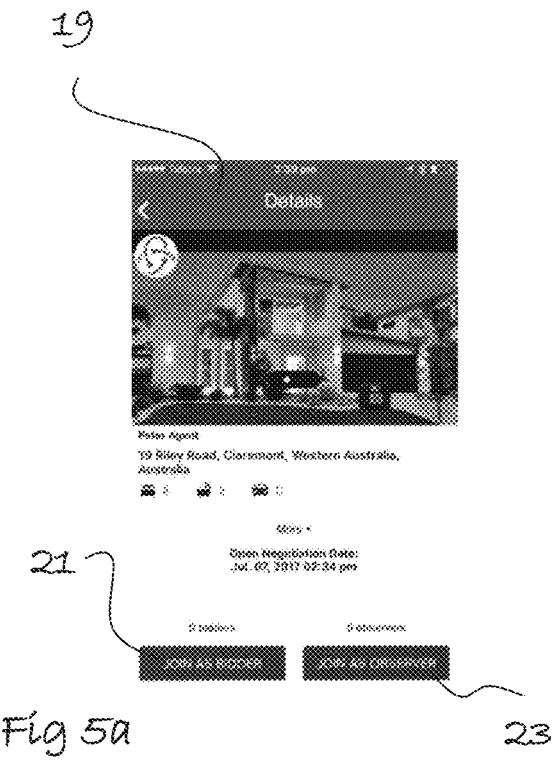
FIGS. 5a to 5c illustrate particular instances of a bidder graphical interface of a user to join as bidder and posting of a particular starting bid.
Figure 5B:
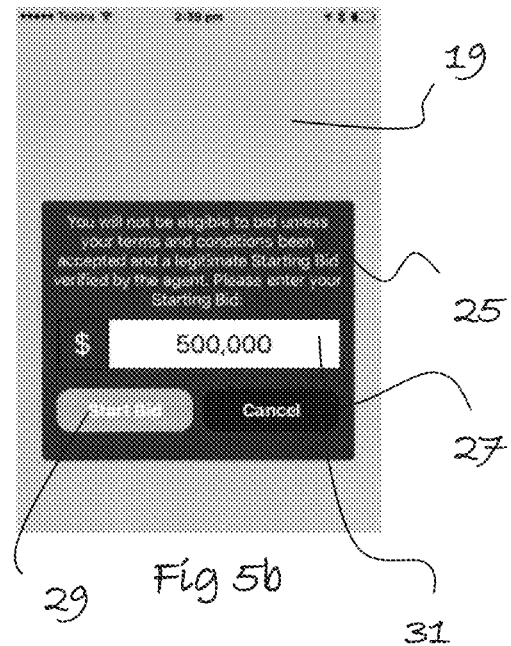
Figure 5C:
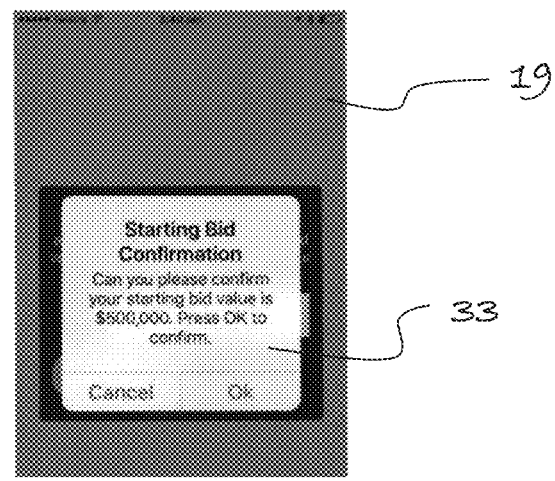

In particular, FIGS. 5a to 5c illustrates particular instances of the bidder graphical interface 19 of a user to join as bidder and posting of a particular starting bid. A particular arrangement of a first instance of the bidder graphical interface 19 prior commencement of the sales mechanism is shown in FIG. 5a. This particular instance shows an image of the property to be sold together with a description of the several characteristics of the property for the bidders 14 to review prior registration at the sales mechanism.

Figure 18:
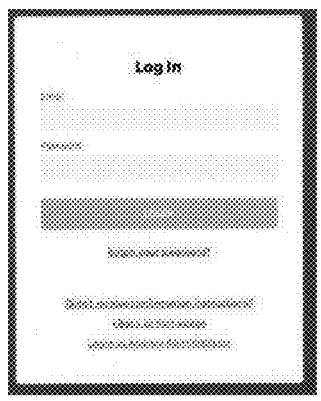
FIG. 18 illustrates a particular instance of the sales facilitator graphical interface for login into the sales mechanism.

Further, this particular interface comprise an icon 21 that after being activated by the bidder 14 generates the interface of the bidders graphical interface 19 permitting login (via graphical interface shown in FIG. 18) in the system 10 to request participation in the sales process. The system 10 is adapted to generate the instances of the bidder's graphical interface 19 that permit the bidders 14 to register into the sales process by providing personal details and the terms of engagement. The instances of the bidder graphical interface 19 for registration of the bidders 14 are similar to the instances of the sales facilitator graphical interface 21 shown in FIGS. 19 and 20 with the difference that other type of information is requested such as personal details of the particular bidder 14 that is registering, digital files including the proposed terms of engagement for revision by the sale facilitator 16 in conjunction with vendor 20.

Further, after registration, the bidder may make the starting bid through a particular instance of the bidder graphical interface 19 shown in FIG. 5b. After making the starting bid, a pop-up window 25 appears in the bidder graphical interface 19 (1) alerting the bidder 14 that only if the terms of engagement have been accepted it is possible to make a legitimate starting bid and (2) providing a text box for inputting the starting bid. Two icons 29 and 31 when activated by the bidder 14 permit either submitting the starting bid or canceling submission of the starting bid.

Any submission of a starting bid as well as any subsequent bid to improve the earlier submitted bids need to be confirmed by the bidder 14 by activating the Ok icon of the pop-up window 33 shown in FIG. 5*c*.

After registration, each bidder 14 may proceed to the instances of the interface 19 of the app of the sales process displayed in the display of the remote devices 22 of the each bidder 14. This is accomplished by touching the section of the cellphone's touchscreen that changes the registration instance of the interface to the instance of the interface prior commencement of the bidding process.

Figures 6, 7A:
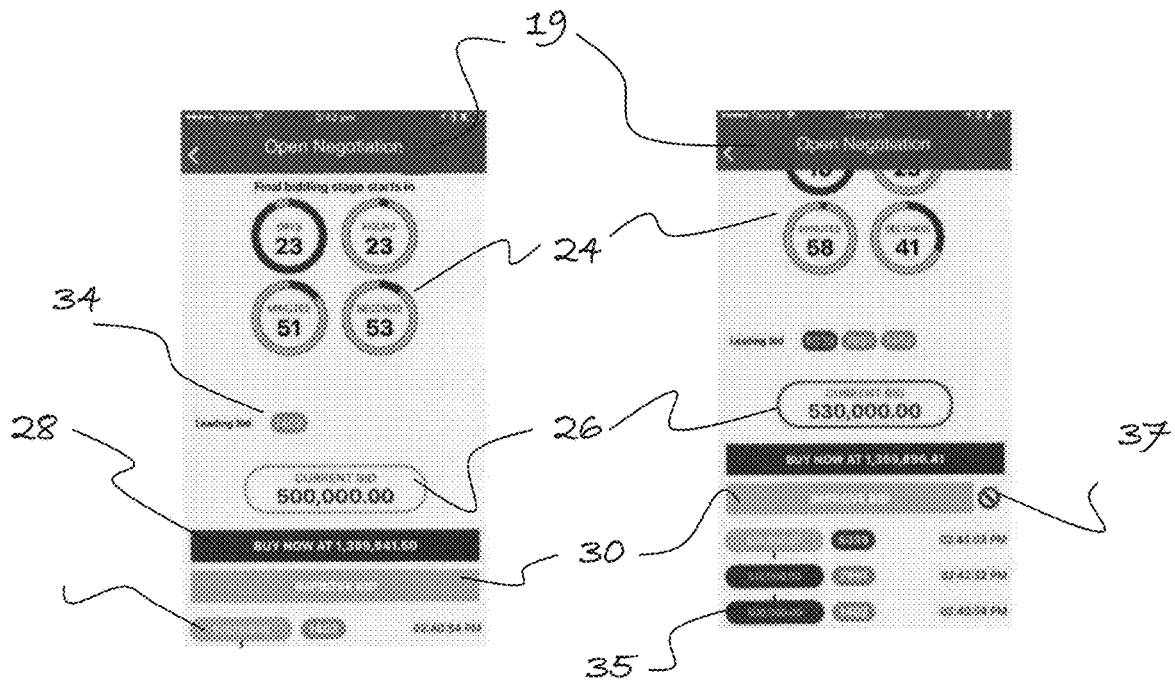
FIGS. 6 and 7a to 7f illustrate particular instances of a bidder graphical interface during the campaign period of the sales mechanism shown in FIG. 1.

FIG. 6 shows a particular instance of the bidder graphical interface 19 during the sales process that the system 10 generated in each of the bidders that have been accepted. This particular instance is generated after the first starting bid is submitted.

FIG. 6 shows one instance of the bidder graphical interface 24. This particular instance of the interface includes a (1) countdown timer 24 indicating to the bidders 14 the time left for the sales mechanism to commence, (2) an icon 26 indicating the amount of the current bid set by bidder 14 that made the last bid; (3) an icon 28 (the Buy-Now button) indicating the amount of money required for buying property without having to participate in bidding period 2, and (4) a button (icon) 30 labeled "Improve bid" for permitting any bidder 14 to make an overriding bid by pressing on the button 30.

As mentioned before, the sales facilitator 16 is able to set the particular amount (referred to as the bid increment) to be added to the current bid (shown in the icon 26).

The interface 19 also includes an area depicting the number of bidders 14 being shown as a listing 35 of the last bid of the bidder 14, code of the bidder 14, and time that the last bid has occurred.

Further, the system 10 is adapted to identify each bidder in conjunction with the particular bid that each bidder 14 has made—this allows anyone to identify which bidder 14 has made a current bid as shown in the icon 26.

The instances of the bidders graphical interface 19 comprises leading bid icons 34 that show at least the three leading bidders 14. Each bid 14 is assigned an icon 34 including an image of the bidder's code and coloured with a particular colour. As can be appreciated in FIG. 4, the first bidder 14 has been assigned the number 1402 and the colour green. In accordance with the present embodiment of the invention, the icon 26 showing the value of the current bid comprises a coloured border, the colour of the border coinciding with the colour that has been assigned to the bidder 14 that made the current bid as shown in the icon 26—in this manner, it is possible to identify which bidder 14 made the current bid.

Moreover, as mentioned before, the bidder graphical interface 19 may include a Buy-Now icon 30. This icon 30 includes an image of the price at which the property would be sold to any of the bidders 14 if activated without having to participate in the sales process. Activation of the icon 30 would stop the campaign period and the purchase period 3 would start only in relation to the bidder 14 that activated the button 30.

In accordance with the present embodiment of the invention, the number depicted in the button 30 is a number which value reduces as time progresses; thus, as the bidders 14 bid during the campaign period increasing the value of the current bid shown in icon 26, the Buy-Now value in icon 30 decreases. In this manner, the bidder's graphical interface 19 provides to the bidders concurrently a view of the increasing current bid value and the Buy-Now price. This facilitates the bidders to decide (by comparing both values) whether to keep participating in the campaign period 1 or to immediately purchase the property by activating the Buy-Now button 30.

Referring now to FIGS. 7 to 15. These figures depict the instances of the bidder's graphical interface 19 during the sales process.

In particular, FIGS. 7*a* to 7*f* depict the instances of the bidder's graphical interface 19 during the campaign period 1. The instances of the bidder's graphical interface 19 shown in FIGS. 7*a* to 7*f* are viewed by the bidders 14 and permit interaction of the bidders 14 with the system 10 during the campaign period 1 as has been described in the relation to FIG. 1 and FIGS. 19 to 27.

During the campaign period 1 any bidder may request withdrawal from the sales process; this may be done by activating an icon 37. After activation of the icon 37 a pop-up window will appear in the bidder graphical interface 19 of the particular bidder 14 that is requesting withdrawal; after confirmation by the particular bidder, the particular bidder 14 is then withdrawn from the sales process and not permitted to re-enter the sales process.

Further, each time a particular bidder 14 activates the improve bid icon 30, a first pop-up window will appear in the bidder graphical interface of the particular bidder 14 showing the amount that the particular bidder 14 will bid; after the bidder 14 accepting the bid, a second pop-up window will appear in the bidder graphical interface of the particular bidder 14 requesting confirmation from the particular bidder 14 and the bid will then be posted in the icon 26 as the new current bid.

Figures 7B, 7C:
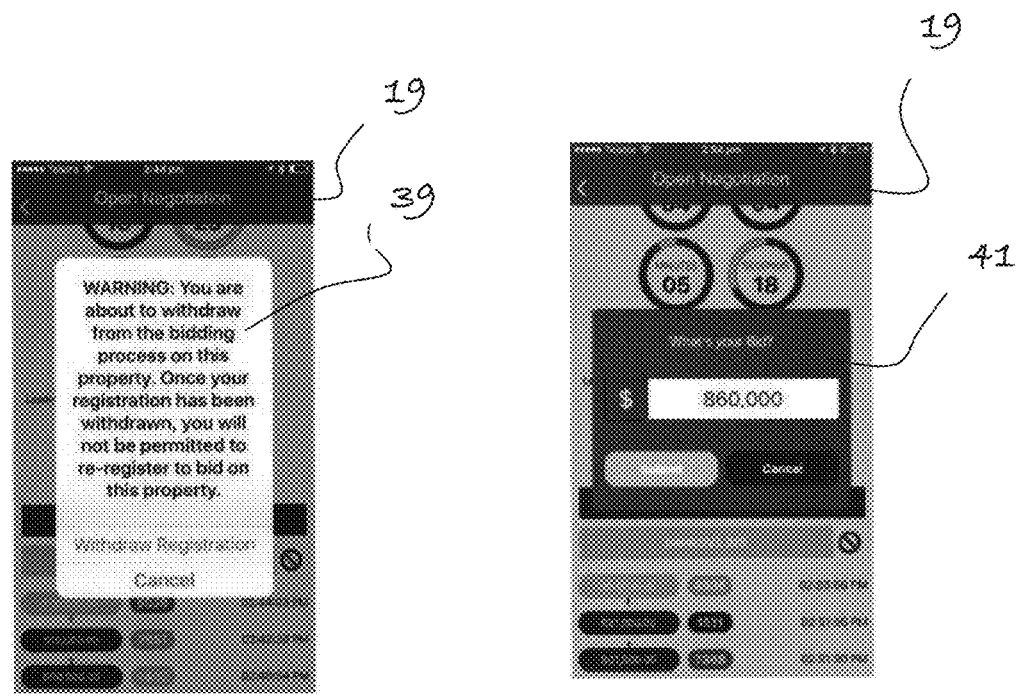
Figure 7D:
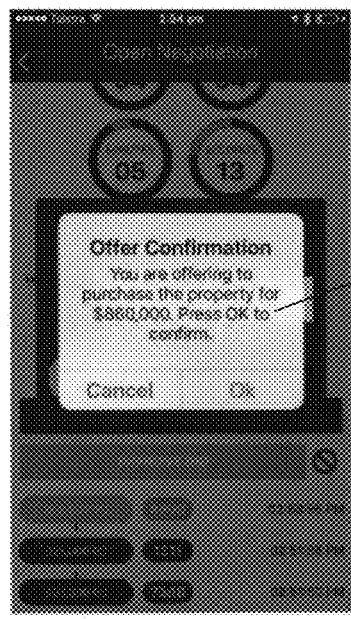
Figure 7E:
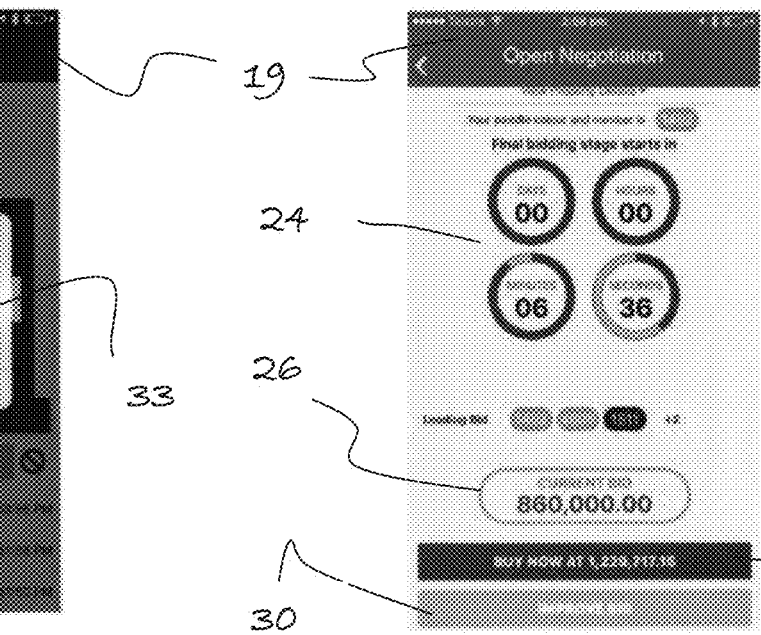
Figure 7F:
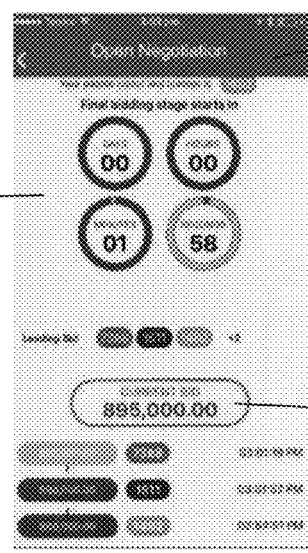
Figures 12A, 12B:
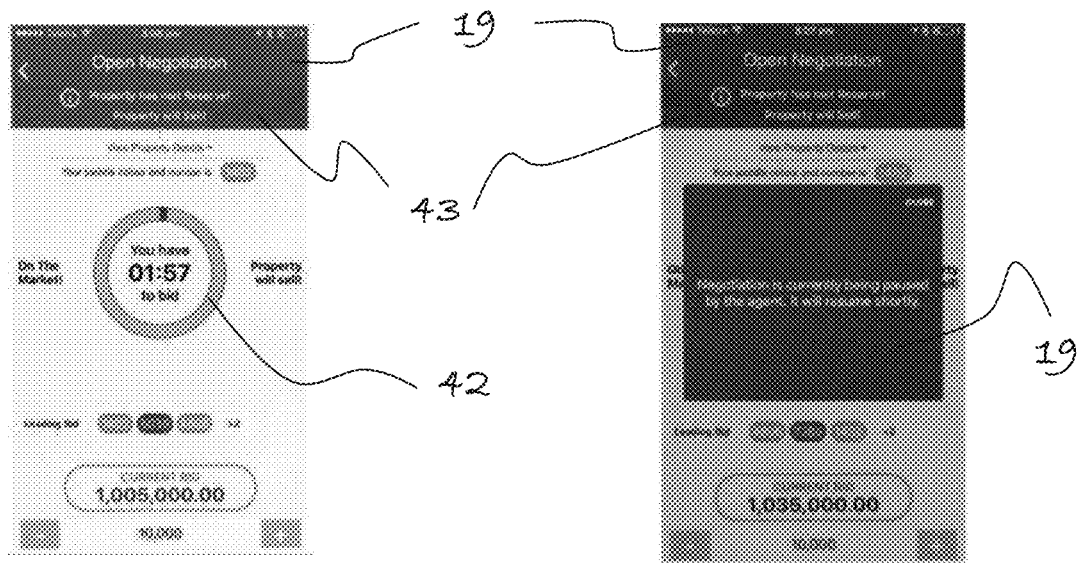

Furthermore, as mentioned before in connection to FIG. 1, during a second period time $T_2$ prior lapsing of the campaign period 1, all of the bidders 14 are impeded from bidding and buying now the property by removal of the Buy-Now icon 28 and the Improve bid icon 30 as is shown in FIG. 7*f*.

FIGS. 8 to 11 depict the instances of the bidder's graphical interface 19 during the first bidding stage of the bidding period 2. As appreciated in FIG. 8 to 11; the instances of the bidders graphical interface 19 during the first bidding stage of the bidding period 2 do not include anymore the Buy-Now button impeding the bidders to immediately buy the property by skipping the bidding period 2. Also, the bidders graphical interface 19 during the first bidding stage of the bidding period 2 include new icons 38*a* (for decreasing the bid increment) and 38*b* (for increasing the bid increment) permitting each bidder 14 to vary the bid increment; this permits each bidder 14 to personalise the increment of the current bid.

Figures 13, 14:
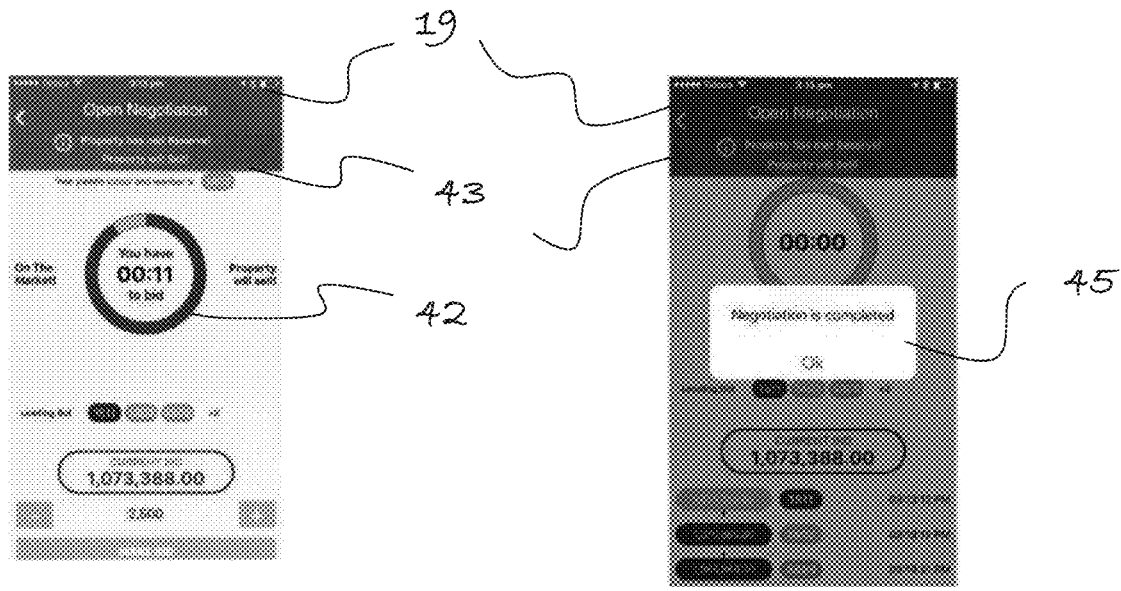

FIGS. 12 to 14 depict the instances of the bidder's graphical interface 19 during the second bidding stage of the bidding period 2. As shown in FIG. 12 to 14, the instances of the bidder's graphical interface 19 during the second bidding stage of the bidding period 2 include a notification to the bidders 14 that the reserve price has been met. The notification (the notification may in the form of a pop-up window 76, such as a red banner 43) includes information regarding the fact that the reserve price has been met and the item is on the market and will sell. Also, the count-down timer 42 is reset to a fixed fifth period of time $T_5$ (such as two minutes) after completion of the fifth period of time $T_5$ the bidder 14 that made the last highest bid will purchase the property.

Figures 15A, 15B:
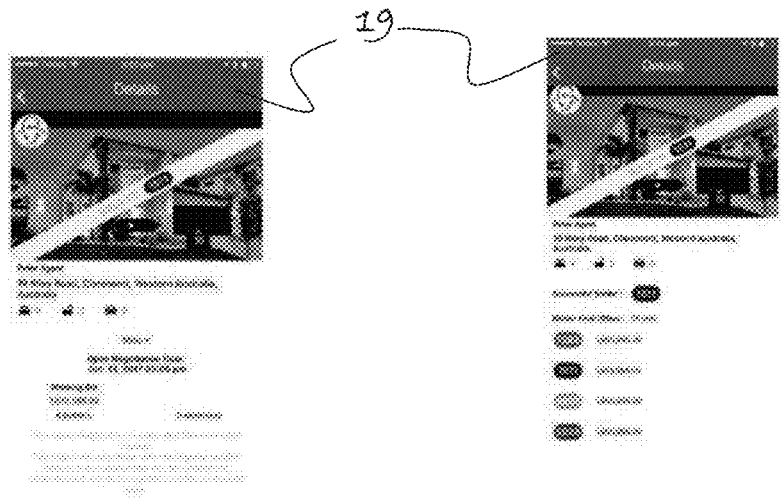
FIGS. 15a and 15b illustrate particular instances of the bidder graphical interface after completion of the bidding period of the sales mechanism shown in FIG. 1.

At this stage, the instances shown in FIG. 15 will be displayed in the screen of the remote devices 22 of the bidders 15.

Figures 16, 17:
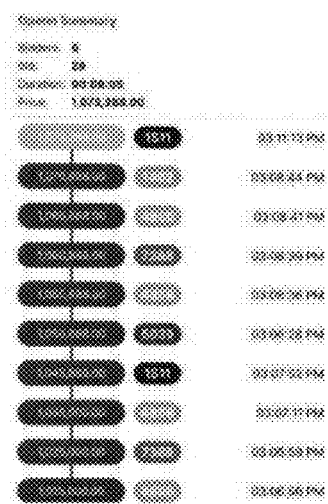
FIG. 16 illustrates a particular bidding timeline of the sales mechanism shown in FIG. 1.
FIG. 17 shows a table comparing the sales mechanism shown in FIG. 1 against several conventional sales mechanisms.

The interface may 19 may provide a timeline of the bidding process that just has finalised. FIG. 16 shows thus timeline illustrating (1) each of the bids and when the bids were submitted and by which of the bidders and (2) the duration of the bidding process, number of bids and the amount of money at which the property was sold. This information is of great value for, for example, valuation of property of the country and around the world.

From the above descriptions it is evident that the sale mechanism in accordance with the present embodiment of the invention provides a sales methodology that is particularly advantageous when compared to conventional sales mechanisms such as for example private treaty, sales mechanism and tender/end sale. FIG. 17 shows a comparison between the sale mechanism in accordance with the present embodiment of the invention and several conventional sales mechanisms. As can be seen from FIG. 17, the sale mechanism in accordance with the present embodiment of the invention has all of the advantages of an ideal sales mechanism in contrast with the above mentioned conventional sale mechanisms.

Further, the bidding process is transparent. For example, the bidding process provides to each of the bidders 14 all of the submitted overriding bids as these overriding bids occur. Provision of each overriding bid is provided to each bidder at substantially the same time as the overriding bid is submitted; in this manner, all bidders 14 at the same time are aware that an overriding bid has been submitted allowing the bidders 14 to know the amount of the overriding bid that just has been submitted.

Furthermore, the bidding process provides every bidder 14, at any time during the duration of the bidding process, an opportunity to submit as many overriding bids as they wish. However, in an arrangement, a same bidder 14 may not submit two consecutive overriding bids.

Moreover, in a particular arrangement the sales facilitator 16 may withdraw or reject any inappropriate bid. The sales facilitator may withdraw or reject the inappropriate bid by interacting with a graphical interface visible only to the sales facilitator.

Modifications and variations as would be apparent to a skilled addressee are deemed to be within the scope of the present invention.

Further, it should be appreciated that the scope of the invention is not limited to the scope of the embodiments disclosed. For example, the sales mechanism in accordance with the present embodiment of the invention have been described in such a manner that the sales facilitator is the responsible party for organising the bidding process and the sales mechanism; however, in accordance with other embodiments other parties may be responsible for organising the bidding process and the sales mechanism.

Throughout this specification, unless the context requires otherwise, the word "comprise" or variations such as "comprises" or "comprising", will be understood to imply the inclusion of a stated integer or group of integers but not the exclusion of any other integer or group of integers.

Furthermore, various different terminologies are used in this specification which relate to graphical user interface elements, such as icons, buttons, text-boxes, regions, areas, media, and windows. It should be understood that these and other terminology refer to Activable Graphics that are displayable on a display screen and that can be activated by the users of the sales mechanism via touch screen, mouse devices and/or keyboards for providing information, executing a particular action and issuing a particular request. The system 10 is adapted to make these graphics activable to permit interaction with the participants and data base servers through the software and hardware of the system.

Further, the terms servers, computers, PCs, tablets, or similar computing devices as well as communication devices such as cellphones are all considered to at least have processors for executing software stored in memory, communications components (e.g., Ethernet or Wi-Fi) for communicating with other devices across a data network, as well as input devices, such as touch screens, mouse devices, or keyboards, to interact with the software. The software may at least include an operating system, a web browser and sales mechanism software.

The invention claimed is:

1. A method for conducting a sales process of an item of real estate to a plurality of bidders implemented in a computer system comprising a server computer comprising at least one processor executing executable code, and at least one non-transitory memory device, communicating with the at least one processor accessible via a computer network and storing the executable code, wherein the executable code, when executed by the at least one processor, causes the at least one processor to generate and transmit, via the computer network, a web site message to a plurality of bidder computing devices and a sales facilitator computing device, the web site message being representative of a web site for offering for sale and selling an item of real estate, the web site comprising a plurality of instances of graphical interfaces comprising activable graphics capable to be activated via the sales facilitator computing device and comprising a plurality of instances of graphical interfaces comprising activable graphics capable to be activated via the bidder computing devices, the method comprising the steps of:

storing information representative of the item in the at least one non-transitory memory device by a sales facilitator through a sales facilitator graphical interface of the sales facilitator computing device;

storing by the sales facilitator particular values of parameters for controlling the sales process in the at least one non-transitory memory device, the parameters comprising (1) first to fifth time periods, (2) a cost for buying the item now, (3) a reserve price of the item;

starting a countdown timer executing in the at least one processor for measuring a particular period of time;

storing information representative of each of the bidders in the at least one non-transitory memory device in response to receiving a bidder message from each of one or more of the bidder computing devices, each bidder message being indicative of information representative of each bidder including terms of engagement proposed by the bidder and approved by the sales facilitator for the item of real estate to enable the bidder to participate in the sales process;

displaying, in response to a first message from the server, a first activable graphics in each of a plurality of bidder graphical interfaces, the first activable graphics being adapted for each of the bidders to input a starting bid for purchasing the item;

displaying, in response to a second message from the server, in each of the bidder graphical interfaces a second activable graphics displaying the cost for buying the item now;

displaying, in response to a third message from the server, in each of the bidder graphical interfaces a third activable graphics adapted to add when activated to the starting bid a bid increment to increase the value of the starting bid to generate an improved bid;

while the particular period of time is less than the first period of time, iteratively performing the steps a and b:
  a) while the particular period of time of time is less than the difference between the first period of time and the second period of time the server permitting the bidders to activate the third activable graphics to continuously improve the value of their improved bid unless one particular bidder activated the second activable graphics displaying the cost for buying the item now in order to purchase the item and culminate the sales process;
  b) when the particular period of time is greater than the difference between the first period of time and the second period of time the server impeding the bidders from activating the second and third activable graphics;

resetting the count-down timer executing in the at least one processor to zero and restarting the count-down time for measuring another particular period of time;

displaying, in response to a fourth message from the server, in each of the bidder graphical interfaces a fourth activable graphics adapted to, when activated by a particular bidder, generate and send a fifth message to the server to improve the bid of the particular bidder;

while the another particular period of time is less than the fourth period of time and any improved bid is smaller than the reserve price, iteratively performing the steps c and d:
  c) permitting any bidder to generate and send a sixth message to the server to improve its earlier bid by activating the fourth activable graphics; and
  d) comparing any of the bid result of improving it earlier after activation of the fourth activable graphics with the reserve price;

resetting the count-down timer executing in the at least one processor, to zero when any improved bid is greater or equal to the reserve price and restarting the count-down time for measuring a further particular period of time;

while the further particular period of time is less than the fifth period of time, iteratively performing the step:
  e) permitting any bidder to generating and send a seventh message to improve its earlier bid by activating the fourth activable graphics;

determining, by the at least one processor, the bidder having the highest improved when compared to the improved bids of the other bidders, and selling the item to the determined bidder in accordance with the terms of engagement associated with the bidder stored in the at least one non-transitory memory device, and during execution of the sales process, storing data in the at least one non-transitory memory device, the data including (1) each of the bids and when the bids were submitted and by which of the bidders and (2) the duration of the bidding process, number of bids and the amount of money at which the property was sold.

2. The method according to claim 1 wherein the terms of engagement by each bidder may differ from the terms of engagement proposed by each of the other bidders.

3. The method according to claim 1, wherein the second activable graphics displaying the cost for buying the item now may be selectively removed or reinstated from the sales process.

4. The method according to claim 3 wherein one or more algorithms control removal or reinstating of the second activable graphics.

5. The method according to claim 3 wherein removal or reinstating of the second activable graphics occurs when the cost for buying the item now is equal to a buy-now end cost.

6. The method according to claim 1, wherein sales process may be selectively paused and restarted by the sales facilitator.

7. The method according to claim 1, wherein comprising the step of issuing a notification that a particular bid is equal or greater than reserve price of the item offered for sale.

8. The method according to claim 1 wherein bids may be improved by increment bids, the bidders being able to vary the value of the increment bids via the fourth activable graphics and the sales facilitator being able to vary the value of the increment bids via activable graphics displayed in the sales facilitator graphical interface.

9. The method according to claim 1 further comprising the step of displaying a particular icon showing the highest current bid made by a particular bidder with respect the bids of the other bidders.

10. The method according to claim 1 further comprising the step of displaying in the bidder graphical interfaces and the sale facilitator graphical interfaces a unique bidder identification for each bidder comprising an icon including an image showing the code of each bidder, wherein the bidder identification for each bidder is assigned a particular characteristic that differs from the characteristic of any other bidder.

11. The method according to claim 10 wherein a particular icon graphics is assigned the same characteristic of the bidder that made the highest current bid displayed in the particular icon graphics.

12. The method according to claim 10 wherein the characteristic comprises colour.

13. The method according to claim 1 further comprising the step of decreasing the value of the cost for buying the item now during a first stage of the sales process and displaying in the second activable graphics the continuously decreasing the cost for buying the item now.

14. The method according to claim 13 further comprising the step of displaying a sixth activable graphics displaying the current highest bid.

15. The method according to claim 14 wherein the second activable graphics displaying the cost for buying the item now and the sixth activable graphics displaying the current highest bid are displayed adjacent each other.

16. The method according to claim 1 further comprising the step of permitting any of the bidder withdraw from the sales process, and storing data regarding the bidder withdrawal in the non-transitory memory device.

17. The method according to claim 1 further comprising the step of permitting the sales facilitator to remove a bid made by a particular bidder.

18. The method according to claim 1 further comprising the step of displaying the last bid made by each bidder.

19. The method according to claim 1 wherein the step of impeding the bidders from activating the second and third activable graphics comprises the step of removing the second and third activable graphics from the bidder graphical interfaces.

20. The method according to claim 19 wherein the step of removing the second and third activable graphics from the bidder graphical interface is conducted by the sales facilitator through the sales facilitator graphical interface.

21. A computer system for conducting a sales process, the computer system comprising:
a server computer comprising:
at least one processor executing executable code; and
at least one non-transitory memory device communicating with the at least one processor accessible via a computer network and storing the executable code, wherein the executable code, when executed by the at least one processor, causes the at least one processor to:
generate and transmit, via the computer network, a web site message to a plurality of bidder computing devices and a sales facilitator computing device, the message being representative of a web site for offering for sale and selling an item of real estate, the web site comprising a plurality of instances of graphical interfaces comprising activable graphics capable to be activated via the sales facilitator computing device and comprising a plurality of instances of graphical interfaces comprising activable graphics capable to be activated via the bidder computing devices;
receive via the computer network, first and second messages from the sales facilitator computing device generated in response to activation of the sales facilitator's activable graphics,
the first message being indicative of information representative of the item, and, responsive to receiving the first message, the at least one processor storing the information in the non-transitory memory device, and
the second message being representative of particular values of parameters for controlling the sales process, the parameters comprising at least: (1) first to fifth time periods, (2) a cost for buying the item now, (3) a reserve price of the item, and, responsive to receiving the second message, the at least one processor storing the values of parameters in the at least one non-transitory memory device;
start a countdown timer executing in the at least one processor for measuring a particular period of time and responsive to starting the countdown timer, the at least one processor generating and transmitting via the computer network a time message to each one of the plurality of bidder computing devices, the time message being representative of the remaining time provided by the countdown timer and causing, at each bidder computing device in response to receiving the time message, display of a particular instance of a graphical interface adapted to display the remaining time for visualisation by the bidders;
receive by the server via the computer network, bidder messages from one or more of the bidder computing devices generated in response to bidder activation of particular activable graphics of the bidder's graphical interface, each bidder message being indicative of information representative of each bidder and in response to receiving each bidder message, the one or more processors storing the values of information representative of each bidder in the non-transitory memory device, wherein the information representative of each bidder includes terms of engagement proposed by the bidder and approved by the sales facilitator for the item of real estate to enable the bidder to participate in the sales process;
receive by the server via the computer network, value messages from one or more of the bidder computing devices generated in response to bidder activation of a first activable graphics of a particular instance of the bidder graphical interfaces, each value message being indicative of information representative of a value of a starting bid of each bidder for purchasing the item and the one or more processors storing the value of the starting bid received from each bidder in the non-transitory memory device;
generate and transmit via the computer network a cost message to the plurality of bidder computing devices, the cost message being representative of a cost for buying the item now and of a second activable graphic of a particular instance of the bidder graphical interface causing, at each bidder computing device in response to receiving the cost message, display of the cost for buying the item now;
generate and transmit via the computer network a third message to the plurality of bidder computing devices, the third message causing, on reception by the bidder computer device display a third activable graphics of a particular instance of the bidder's graphical interface adapted to, when activated by the bidders, generate and transmit a fourth message to the server via the computer network to, responsive to reception by the server, cause the one or more processors to add to the starting bid for the bidder, as stored in the non-transitory memory device, a bid increment to increase the value of the starting bid to generate an improved bid for the bidder and store the improved bid in the non-transitory memory device;
while the particular period of time is less than the first period of time, iteratively performing the steps a and b:
a) while the particular period of time of time is less than the difference between the first period of time and the second period of time permitting reception of fourth messages generated in response to the bidders to activating the third activable graphics to continuously improve the value of their improved bid unless one particular bidder activated the second activable graphics displaying the cost for buying the item now in order to purchase the item and culminate the sales process;
b) when the particular period of time is greater than the difference between the first period of time and the second period of time impeding the bidders from activating the second and third activable graphics;
resetting the count-down timer, executing in the at least one processor, to zero and restarting the count-down timer for measuring another particular period of time;
generate and transmit via the computer network a remaining time message to the plurality of bidder computing devices, the message being representative of the another remaining time provided by the countdown timer to cause a particular instance of the bidder's graphical interface to display the another remaining time on the bidder computer devices;
generate and transmit via the computer network a fifth message to the plurality of bidder computing devices, the fifth message causing, on reception by the bidder computer device display a fourth activable graphics of a particular instance of the bidder's graphical interface adapted to, when activated by a particular bidder, generate and transmit a sixth message to the server via the computer network to, responsive to reception by the server, cause the one or more processors to improve the bid of the particular bidder and store the improved bid in the non-transitory memory device;

while the another particular period of time is less than the fourth period of time and any improved bid is smaller than the reserve price, iteratively performing the steps c and d:

c) permitting reception of sixth messages from any bidder to improve its earlier bid by activating the fourth activable graphics; and d) comparing any of the bid result of improving it earlier after activation of the fourth activable graphics with the reserve price;

resetting the count-down timer, executing in the at least one processor, to zero when any improved bid is greater or equal to the reserve price, and restarting the count-down timer, executing in the at least one processor, to measure a further particular period of time and generate and transmit via the computer network an additional remaining time message to the plurality of bidder computing devices, the additional remaining time message being representative of the further remaining time provided by the countdown timer and of a particular instance of the bidder graphical interface to cause display of the further remaining time on the bidder computer devices; and while the further particular period of time is less than the fifth period of time, iteratively performing the step:

e) permitting reception of sixth messages from any bidder to improve its earlier bid by activating the fourth activable graphics;

determining, by the at least one processor, the bidder having the highest improved bid when compared to the improved bids of the other bidders, the determined bidder being to whom the item will be sold in accordance with the terms of engagement stored in association with the bidder, and wherein during the execution of the sales process data is stored in memory including (1) each of the bids and when the bids were submitted and by which of the bidders and (2) the duration of the bidding process, number of bids and the amount of money at which the property was sold.

22. A non-transitory computer readable storage medium storing one or more programs, the one or more programs comprising instructions that, when rendered on a remote computing device, cause the remote computing device to display a web site comprising a plurality of graphical interfaces capable to be activated by a sales facilitator or a plurality of graphical interfaces capable to be activated by a particular bidder when the remote computing device is connected over the internet to a server computer comprising at least one processor executing executable code and at least one non-transitory memory device communicating with the processor accessible via a computer network and storing the executable code, wherein the executable code, when executed by the at least one processor, causes the at least one processor to:

generate and transmit, via the computer network, a web site message to a plurality of bidder computing devices and a sales facilitator computing device, the web site message being representative of a web site for offering for sale and selling an item of real estate, the web site comprising a plurality of instances of graphical interfaces comprising activable graphics capable to be activated via the sales facilitator computing device and comprising a plurality of instances of graphical interfaces comprising activable graphics capable to be activated via the bidder computing devices;

receive, via the computer network, first and second messages from the sales facilitator computing device generated in response to activation of the sales facilitator's activable graphics, the first message being indicative of information representative of the item, and, responsive to receiving the first message, the at least one processor storing the information in the non-transitory memory device, and the second message being representative of particular values of parameters for controlling the sales process, the parameters comprising at least:
(1) first to fifth time periods,
(2) a cost for buying the item now,
(3) a reserve price of the item, and, responsive to receiving the second message, the at least one processor storing the values of parameters in the non-transitory memory device;

starting a countdown timer executing in the at least one processor for measuring a particular period of time and responsive to starting the countdown timer, the at least one processor generating and transmitting via the computer network a remaining time message to each one of the plurality of bidder computing devices, the remaining time message being representative of the remaining time provided by the countdown timer and causing, at each bidder computing device in response to receiving the message, display of a particular instance of a graphical interface adapted to display the remaining time for visualisation by the bidders;

receive by the server via the computer network, bidder messages from one or more of the bidder computing devices generated in response to bidder activation of particular activable graphics of the bidder's graphical interface, each bidder message being indicative of information representative of each bidder and in response to receiving each bidder message, the one or more processors storing the values of information representative of each bidder in the non-transitory memory device, wherein the information representative of each bidder includes terms of engagement proposed by the bidder and approved by the sales facilitator for the item of real estate to enable the bidder to participate in the sales process;

receive, by the server via the computer network, value messages from one or more of the bidder computing devices generated in response to bidder activation of a first activable graphics of a particular instance of the bidder graphical interfaces, each value message being indicative of information representative of a value of a starting bid of each bidder for purchasing the item and the one or more processors storing the value of the starting bid received from each bidder in the non-transitory memory device;

generate and transmit via the computer network a cost message to the plurality of bidder computing devices, the cost message being representative of a cost for buying the item now and of a second activable graphic of a particular instance of the bidder graphical interface causing, at each bidder computing device in response to receiving the cost message, display of the cost for buying the item now;

generate and transmit via the computer network a third message to the plurality of bidder computing devices, the third message causing, on reception by the bidder computer device display of a third activable graphics of a particular instance of the bidder's graphical interface adapted to, when activated by the bidders generate and transmit a fourth message to the server via the computer network to, responsive to reception by the server, cause the one or more processors to add to the starting bid for the bidder, as stored in the non-transitory memory device, a bid increment to increase the value of the starting bid to generate an improved bid for the bidder and store the improved bid in the non-transitory memory device;

while the particular period of time is less than the first period of time, iteratively performing the steps a and b:
a) while the particular period of time of time is less than the difference between the first period of time and the second period of time permitting reception of fourth messages generated in response to the bidders to activating the third activable graphics to continuously improve the value of their improved bid unless one particular bidder activated the second activable graphics displaying the cost for buying the item now in order to purchase the item and culminate the sales process;
b) when the particular period of time is greater than the difference between the first period of time and the second period of time impeding the bidders from activating the second and third activable graphics;

reset the count-down timer, executing in the at least one processor, to zero and restarting the count-down timer for measuring another particular period of time;

generate and transmit a remaining time message to the plurality of bidder computing devices, the remaining time message being representative of the another remaining time provided by the countdown timer and of a particular instance of the bidder's graphical interface for displaying the another remaining time for visualisation by the bidders;

generate and transmit via the computer network a fifth message to the plurality of bidder computing devices, the fifth message causing, on reception by the bidder computer device display a fourth activable graphics of a particular instance of the bidder's graphical interface adapted to, when activated by a particular bidder, generate and transmit a sixth message to the server via the computer network to, responsive to reception by the server, cause the one or more processors to improve the bid of the particular bidder and store the improved bid in the non-transitory memory device;

while the another particular period of time is less than the fourth period of time and any improved bid is smaller than the reserve price, iteratively performing the steps c and d:
c) permitting reception of sixth messages from any bidder to improve its earlier bid by activating the fourth activable graphics; and
d) comparing any of the bid result of improving it earlier after activation of the fourth activable graphics with the reserve price;

resetting the count-down timer, executing in the at least one processor, to zero when any improved bid is greater or equal to the reserve price, and restarting the count-down timer executing in the at least one processor, to measure a further particular period of time and generate and transmit via the computer network an additional remaining time message to the plurality of bidder computing devices, the additional remaining time message being representative of the further remaining time provided by the countdown timer and of a particular instance of the bidder graphical interface to cause display of the further remaining time on the bidder computer devices; and while the further particular period of time is less than the fifth period of time, iteratively performing the step:
e) permitting reception of sixth messages from any bidder to improve its earlier bid by activating the fourth activable graphics;

determining, by the at least one processor, the bidder having the highest improved bid when compared to the improved bids of the other bidders the determined bidder being to whom the item will be sold in accordance with the terms of engagement stored in association with the bidder, and wherein during the execution of the sales process, data is stored in memory including (1) each of the bids and when the bids were submitted and by which of the bidders and (2) the duration of the bidding process, number of bids and the amount of money at which the property was sold.

\* \* \* \* \*